(12) United States Patent
Yamada

(10) Patent No.: US 6,697,536 B1
(45) Date of Patent: Feb. 24, 2004

(54) DOCUMENT IMAGE SCANNING APPARATUS AND METHOD THEREOF

(75) Inventor: Keiji Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/549,467

(22) Filed: Apr. 14, 2000

(30) Foreign Application Priority Data

Apr. 16, 1999 (JP) .......................................... 11-110125

(51) Int. Cl.[7] ................................................. G06K 9/40
(52) U.S. Cl. ...................... 382/275; 358/461; 358/463; 358/464; 358/515; 382/163; 382/164; 382/165; 382/203; 382/219
(58) Field of Search ............................... 382/163, 275, 382/164–165, 170–171, 190, 199, 203, 219; 358/1.6, 463–464, 448, 461–462, 515

(56) References Cited

U.S. PATENT DOCUMENTS

| | | | | |
|---|---|---|---|---|
| 5,377,019 A | * | 12/1994 | Okisu et al. | 358/464 |
| 5,511,148 A | * | 4/1996 | Wellner | 358/1.6 |
| 6,144,403 A | * | 11/2000 | Otani | 348/17 |

OTHER PUBLICATIONS

Nakagawa, et al. "Document Management by Desk Scene Analysis" Pattern Recognition and Media Understanding (PRMU) 98–153 pp. 25–42 (1998).

"The Electronics Information and Communication Handbook" The Institute of Electronics Information and Communication Engineers. Pp 1106 § 5. 1. 2. (1998).

* cited by examiner

Primary Examiner—Bhavesh M. Mehta
Assistant Examiner—Gregory Desire
(74) Attorney, Agent, or Firm—Foley & Lardner

(57) ABSTRACT

A document image scanning apparatus which can obtain a document image at the right timing by separating a hand image from the document image, even when a hand does not take off a document. The document image scanning apparatus consists of an image inputting apparatus and a document image scanning section. The document image scanning section consists of an image memorizing section, a movement detecting section, an image being still detecting section detecting that an inputted image became still, a hand region detecting section that detects the hand region, a hand region removing section that removes the hand region detected at the hand region detecting section, a hand movement feature extracting section that extracts features of hand movements, a document movement feature extracting section that extracts features of document movements, a turning pages or moving documents judging section that judges whether the movement is turning pages or moving documents by the features extracted at the hand movement feature extracting section and the document movement feature extracting section, a document region judging section that judges the document region based on the turning pages or moving documents movement, and a document image forming section that obtains a document image by cutting out the document image displayed when the inputted image being still is detected.

9 Claims, 24 Drawing Sheets

F I G. 3
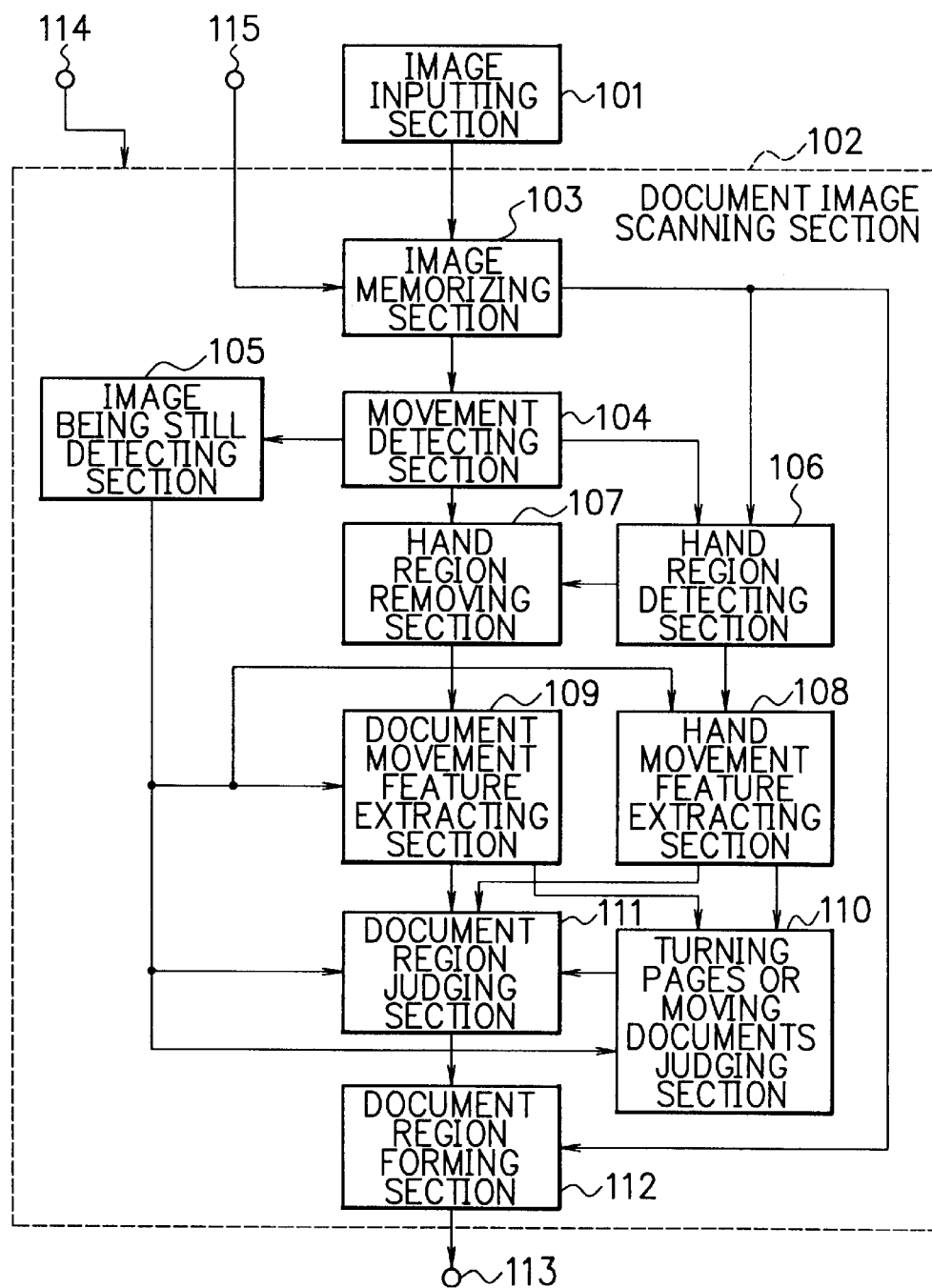

F I G. 10
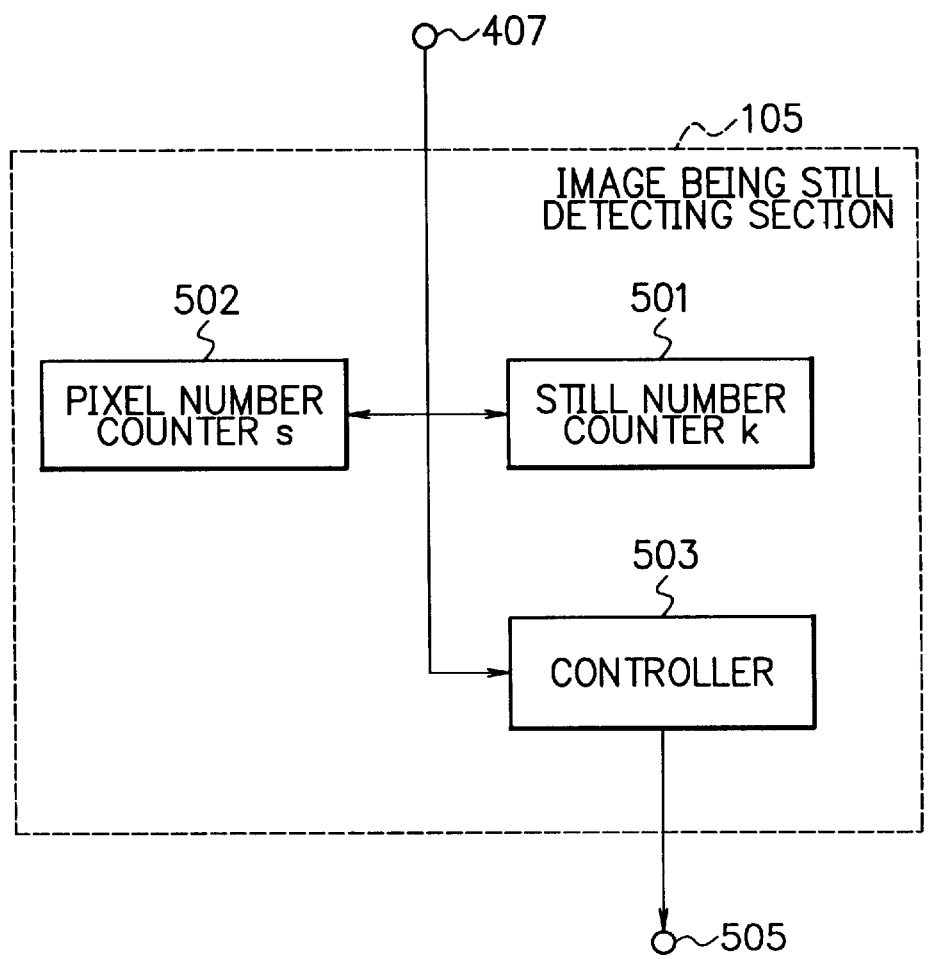

DOCUMENT IMAGE SCANNING APPARATUS AND METHOD THEREOF

BACKGROUND OF THE INVENTION

The present invention relates to a document image scanning apparatus and method thereof, which obtain document images by using a non-contact type image inputting apparatus such as a camera, in particular, which can obtain the document images at the right timing by separating hand images from document images technically even at the case that an operator does not take the hand off the documents.

DESCRIPTION OF THE RELATED ART

As a conventional document image scanning apparatus, for example, Technical Report of The Institute of Electronics Information and Communication Engineers describes "Document Management by Desk Scene Analysis" in pattern recognition and media understanding (PRMU) 98-153 pp. 25–32, 1998. And the operation of a document image scanning apparatus is mentioned in a Fig.

FIG. 1 is a perspective view of this conventional document image scanning apparatus. As shown in FIG. 1, this conventional document image scanning apparatus consists of an image inputting section 101 composed of a scanner that is a non-contact type instrument such as a camera, and obtains images at a designated time interval, and a document image scanning section 202. This conventional document image scanning apparatus detects a document 303 that a hand 304 of an operator places on a desk, and obtains an image of the document.

FIG. 2 is a block diagram showing a structure of the conventional document image scanning apparatus. As mentioned above, the conventional document image scanning apparatus consists of the image inputting section 101 and the document image scanning section 202. The document image scanning section 202 consists of an image memorizing section 103, a movement detecting section 104, a hand region detecting section 206, a hand region removing section 207, and a document image forming section 212. With this structure, for example, the image inputting section 101 takes images at a speed of a sheet per ten seconds and transfers the taken images to the document image scanning section 202.

Each section of the document image scanning section 202 performs the following operation. First, the images transferred from the image inputting section 101 are memorized at the image memorizing section 103, and the images memorized in the image memorizing section 103 are transferred to the movement detecting section 104. At the movement detecting section 104, the difference in corresponding pixels between an image I (t) at time "t" and an image I (t−1) at right before time "t−1" is calculated. And the difference image F of the calculated result is transferred to the hand region detecting section 206 and the hand region removing section 207. At the hand region detecting section 206 divides the difference image F into regions, and the regions connecting to the upper side in the difference image F are detected as the hand regions, and the detected regions are transferred to the hand region removing section 207. The hand region removing section 207 removes the regions detected at the hand region detecting section 206 from the difference image F, and judges the remaining parts in the difference image F as a document region, and transfers the remaining region to the document image forming section 212. The document image forming section 212 cuts out the same region that the hand region removing section 207 judged as the document region from the image I (t) read from the image memorizing section 103, and forms a sheet of an image and makes the image the document image. And the document image is outputted from a terminal 113.

However, at the conventional document image scanning apparatus mentioned above, there are following problems. At the conventional document image scanning apparatus, the hand region detecting section 206 regards the region connecting to the upper side of the image as the hand region, and decides that the region removed the regarded hand region is the document region. However, when an operator handles documents on a desk, the operator does not always take the hand off the document. Therefore, there is a problem that the document image can not be obtained, unless the operator takes the hand off the document.

And the document image is obtained at the timing when the hand is taken off the document, therefore, when a document is obtained in a state that the hand is not taken off the document, there is a problem that the document part and the hand part can not be separated. And also, there is a problem that the timing when the document should be obtained can not be controlled. And in case that the pages of a book are turned, there is a problem that unnecessary images during the pages are turning are obtained.

SUMMARY OF THE INVENTION

It is therefore an object of the present invention to provide a document image scanning apparatus and method thereof, in which document images can be obtained at the right timing by separating hand images from document images technically, even at the case that the hand images and the document images are not separated.

According to a first aspect of the present invention, there is provided a document image scanning apparatus, in which images are inputted in a designated interval by using a non-contact type image inputting apparatus and document images are obtained from said inputted images. The document image scanning apparatus provides an image being still detecting means for detecting that said inputted image became still, and a document forming means for obtaining said document image by cutting out from an image displayed at when said image being still detecting means detected a still image.

According to a second aspect of the present invention, a document image scanning apparatus, in which images are inputted in a designated interval by using a non-contact type image inputting apparatus and document images are obtained from said inputted images, provides an image being still detecting means for detecting that said inputted image became still, a hand region detecting means for detecting a hand region, a hand region removing means for removing said hand region, and a document forming means for obtaining said document image by cutting out from an image displayed at when said image being still detecting means detected a still image.

According to a third aspect of the present invention, a document image scanning apparatus, in which images are inputted in a designated interval by using a non-contact type image inputting apparatus and document images are obtained from said inputted images, provides an image being still detecting means for detecting that said inputted image became still, a hand region detecting means for detecting a hand region, a hand region removing means for removing said hand region, a hand movement feature extracting means for extracting features of hand movements, a document movement feature extracting means for extracting features of document movements, a turning pages or moving documents judging means for judging whether a movement is turning pages or moving documents from said features extracted at said hand movement feature extracting means and said document movement feature extracting means, a document region judging means for judging a document region by said movement of turning pages or moving documents, and a document forming means for obtaining said document image by cutting out from an image displayed at when said image being still detecting means detected a still image.

According to a fourth aspect of the present invention, a document image scanning apparatus, in which images are inputted in a designated interval by using a non-contact type image inputting apparatus and document images are obtained from said inputted images, provides a hand region detecting means for detecting a hand region, a hand region removing means for removing said hand region, and a document forming means for obtaining said document image by cutting out from a displayed image.

According to a fifth aspect of the present invention, a document image scanning apparatus, in which images are inputted in a designated interval by using a non-contact type image inputting apparatus and document images are obtained from said inputted images, provides a hand region detecting means for detecting a hand region, a hand region removing means for removing said hand region, a hand movement feature extracting means for extracting features of hand movements, a document movement feature extracting means for extracting features of document movements, a turning pages or moving documents judging means for judging whether a movement is turning pages or moving documents from said features extracted at said hand movement feature extracting means and said document movement feature extracting means, a document region judging means for judging a document region by said movement of turning pages or moving documents, and a document forming means for obtaining said document image by cutting out from an displayed image.

According to a sixth aspect of the present invention, a document image scanning method, in which images are inputted in a designated interval by using a non-contact type image inputting apparatus and document images are obtained from said inputted images, provides the steps of, detecting that said inputted image became still, and forming a document image by cutting out from an image displayed at when a still image is detected at said step detecting that said inputted image became still.

According to a seventh aspect of the present invention, a document image scanning method, in which images are inputted in a designated interval by using a non-contact type image inputting apparatus and document images are obtained from said inputted images, provides the steps of, detecting that said inputted image became still, detecting a hand region, removing said hand region, and forming a document image by cutting out from an image displayed at when a still image is detected at said step detecting that said inputted image became still.

According to eighth aspect of the present invention, a document image scanning method, in which images are inputted in a designated interval by using a non-contact type image inputting apparatus and document images are obtained from said inputted images, provides the steps of, detecting that said inputted image became still, detecting a hand region, removing said hand region, extracting features of hand movements, extracting features of document movements, judging whether a movement is turning pages or moving documents from said features extracted at said steps of extracting hand movement features and extracting document movement features, judging a document region by said step of said judging whether said movement is turning pages or moving documents, and forming a document image by cutting out from an image displayed at when a still image is detected at said step detecting that said inputted image became still.

According to a ninth aspect of the present invention, a document image scanning method, in which images are inputted in a designated interval by using a non-contact type image inputting apparatus and document images are obtained from said inputted images, provides the steps of, detecting a hand region, removing said hand region, and forming a document image by cutting out from an image displayed.

According to a tenth aspect of the present invention, a document image scanning method, in which images are inputted in a designated interval by using a non-contact type image inputting apparatus and document images are obtained from said inputted images, provides the steps of, detecting a hand region, removing said hand region, extracting features of hand movements, extracting features of document movements, judging whether a movement is turning pages or moving documents from said features extracted at said steps of extracting hand movement features and extracting document movement features, judging a document region by said step judging whether said movement is turning pages or moving documents, and forming a document image by cutting out from an image displayed.

BRIEF DESCRIPTION OF THE DRAWINGS

The objects and features of the present invention will become more apparent from the consideration of the following detailed description taken in conjunction with the accompanying drawings in which:

FIG. 3 is a block diagram showing the whole structure of an embodiment of a document image scanning apparatus of the present invention;

FIG. 10 is a block diagram showing an image being still detecting section in the document image scanning apparatus of the present invention;

DESCRIPTION OF THE PREFERRED EMBODIMENTS

Figure 1:
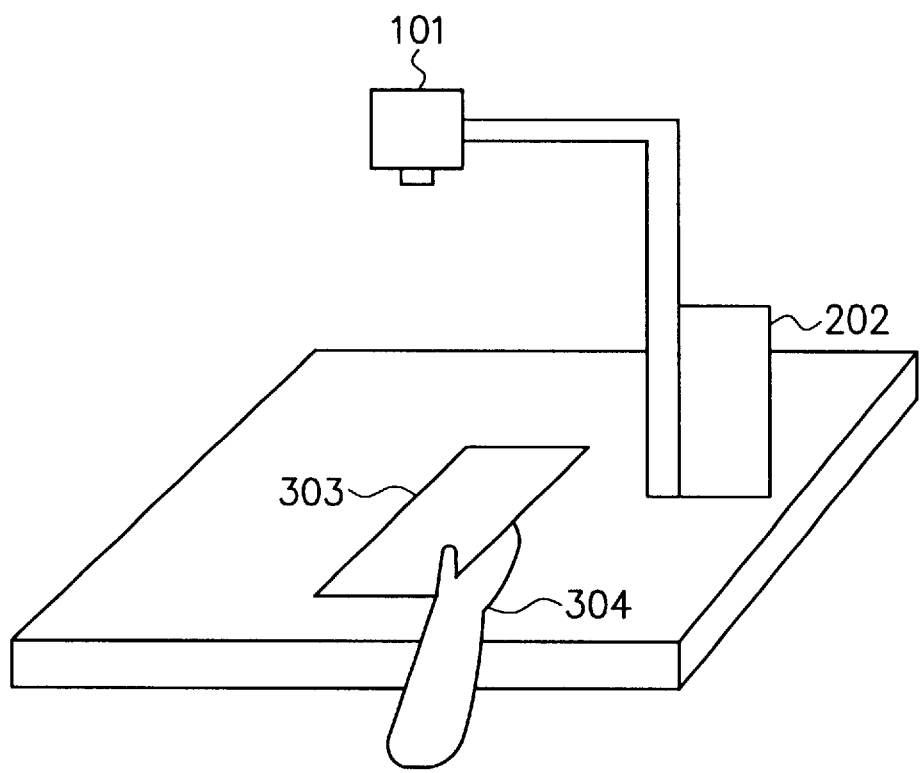
FIG. 1 is a perspective view of a conventional document image scanning apparatus.
Figure 2:
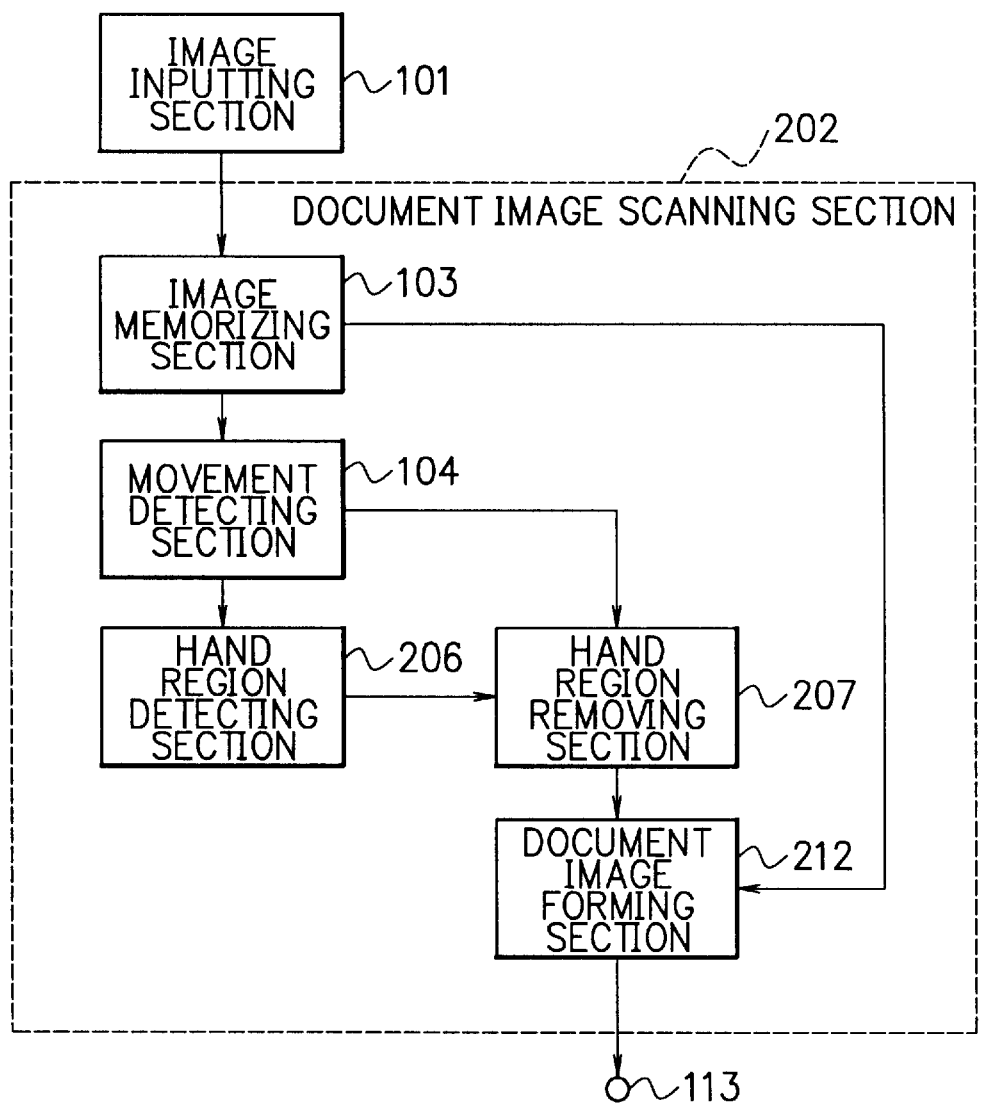
FIG. 2 is a block diagram showing a structure of the conventional document image scanning apparatus.

Referring now to the drawings, an embodiment of the present invention is explained in detail. FIG. 3 is a block diagram showing the whole structure of an embodiment of a document image scanning apparatus of the present invention. The document image scanning apparatus of the present invention consists of an image inputting section 101 and a document image scanning section 102.

The document image scanning section 102 consists of an image memorizing section 103, a movement detecting section 104, an image being still detecting section 105 which detects that an inputted image is still, a hand region detecting section 106 which detects a hand region, a hand region removing section 107 which removes the hand region detected by the hand region detecting section 106, a hand movement feature extracting section 108 which extracts features of hand movements, a document movement feature extracting section 109 which extracts features of document movements, a turning pages or moving documents judging section 110 which judges whether the movement is turning pages of the documents or moving the documents from the features extracted at the hand movement feature extracting section 108 and the document movement feature extracting section 109, a document region judging section 111 which judges the region of the document by the turning pages movement or the document movement, and a document image forming section 112 which obtains the document image by cutting out the document image from the image memorizing section 103 when the inputted image being still is detected. And in FIG. 3, the document image scanning section 102 provides an output terminal 113, input terminals 114 and 115 to which designated signals are inputted from external instruments.

At the structure mentioned above, the image inputting section 101 shoots scenes, which are in front of the image inputting section 101, one to sixty pieces per second, and transfers the shot scenes to the document image scanning section 102 as images. Each of the sections in the document image scanning section 102 performs the following operations.

Figure 4:
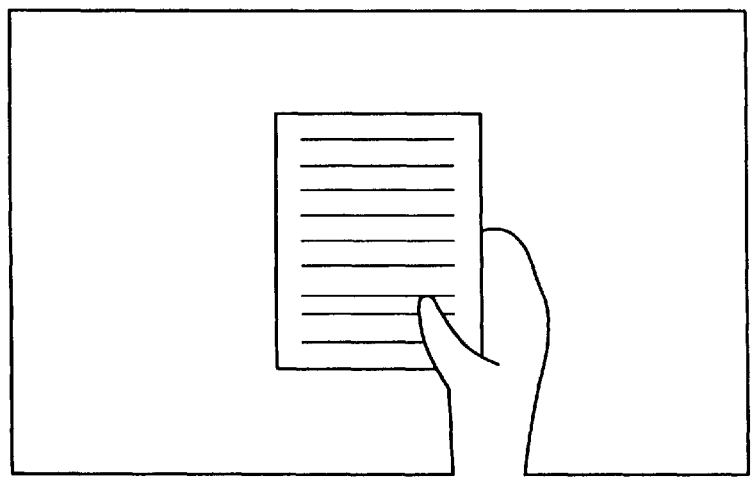
FIG. 4 is a diagram showing a document to be inputted by a hand.
Figure 5:
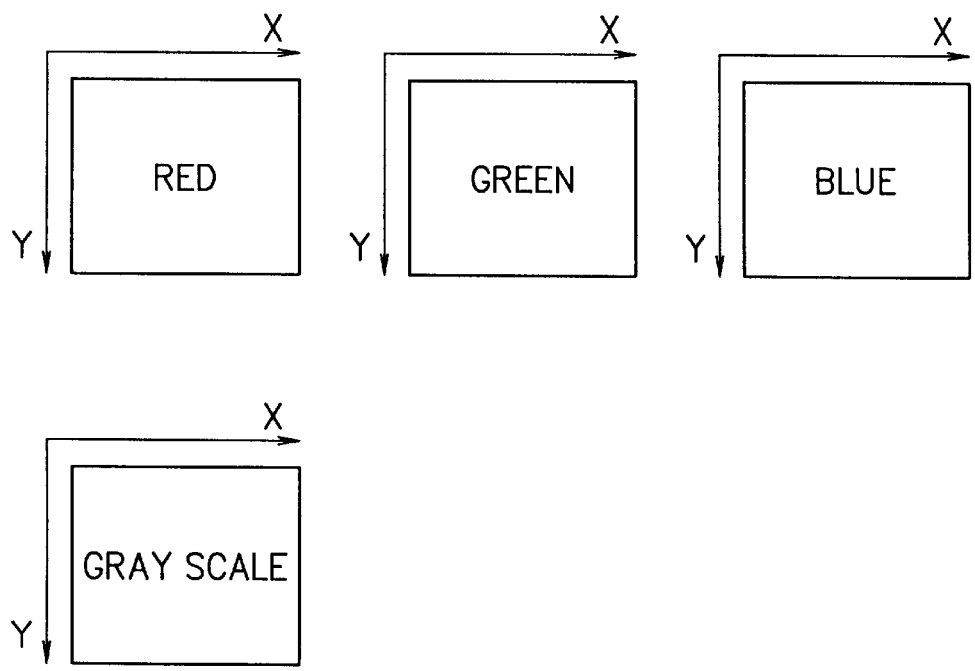
FIG. 5 is a diagram showing a structure of an image to be inputted.

First, an image taken at the image inputting section 101 is memorized in the image memorizing section 103. FIG. 4 is a diagram showing a document to be inputted by a hand. As shown in FIG. 4, the document to be inputted is a document that an operator has in the hand. FIG. 5 is a diagram showing a structure of an image to be inputted. As shown in FIG. 5, the image to be inputted is a normal color image composed of a red image, a green image, a blue image, and further a gray scale image. The gray scale image can be formed by the red, green, and blue images, therefore the gray scale image is not always needed.

Each image is expressed in a two dimensional arrangement of pixels, and consists of M×N pixels at M pixels in X axis and N pixels in Y axis. The coordinate of the image has its origin at the upper left position, and the value of X coordinate increases to the right direction and the value of Y coordinate increases to the down direction.

The image memorized in the image memorizing section 103 is transferred to the movement detecting section 104, the hand region detecting section 106, and the document image forming section 112.

The movement detecting section 104 judges whether a difference between the images inputted at a certain time and at a next time exists or not, and defines the image recorded the difference part as a difference image. And the movement detecting section 104 transfers the difference image to the hand region detecting section 106, the hand region removing section 107, and the image being still detecting section 105.

The image being still detecting section 105 investigates the counter value of the difference image transferred from the movement detecting section 104, and judges that the image is still when the movement of the counter value stops for more than a designated time. And after this, the image being still detecting section 105 transfers a still signal to the hand movement feature extracting section 108, the document movement feature extracting section 109, the turning pages or moving documents judging section 110, and the document region judging section 111.

The hand region detecting section 106 detects a similar color region to the hand color defined beforehand from the image transferred from the image memorizing section 103, and detects a region being overlapped with the part existed movement detected at the movement detecting section 104 as a true hand region. And the hand region detecting section 106 transfers the image expressed the true hand region to the hand region removing section 107 and the hand movement feature extracting section 108.

The hand region removing section 107 removes two true hand regions detected at the hand region detecting section 106 at a certain time and a right before the certain time from the difference image formed at the movement detecting section 104, and forms an image deleted the part of hand and makes the image a document region.

A document region observed at a certain time may be an image whose page is turning, therefore, the hand region detecting section 106 transfers the hand region detected at the hand region detecting section 106 to the hand movement feature extracting section 108. And the hand movement feature extracting section 108 extracts features of hand movements and transfers the extracted features of hand movements to the turning pages or moving documents judging section 110 and the document region judging section 111.

The document region formed at the hand region removing section 107 is transferred to the document movement feature extracting section 109. And the document movement feature extracting section 109 extracts features of document movements and transfers the extracted features of document movements to the turning pages or moving documents judging section 110 and the document region judging section 111.

The turning pages or moving documents judging section 110 judges whether the movement of hand expressed in a series of images is turning pages of the documents or moving the documents by capturing the documents, based on the amount of features transferred from the hand movement feature extracting section 108 and the document movement feature extracting section 109. And the judged result is transferred to the document region judging section 111.

The document region judging section 111 forms images being a case of turning pages and a case of moving the documents beforehand. And the document region judging section 111 selects a range existing the document based on the signal transferred from the turning pages or moving documents judging section 110, and transfers the selected range to the document image forming section 112.

The document image forming section 112 cuts out the document part from the image memorized in the image memorizing section 103 based on the range of the document transferred from the document region judging section 111, and the document is outputted from the output terminal 113.

Figure 6:
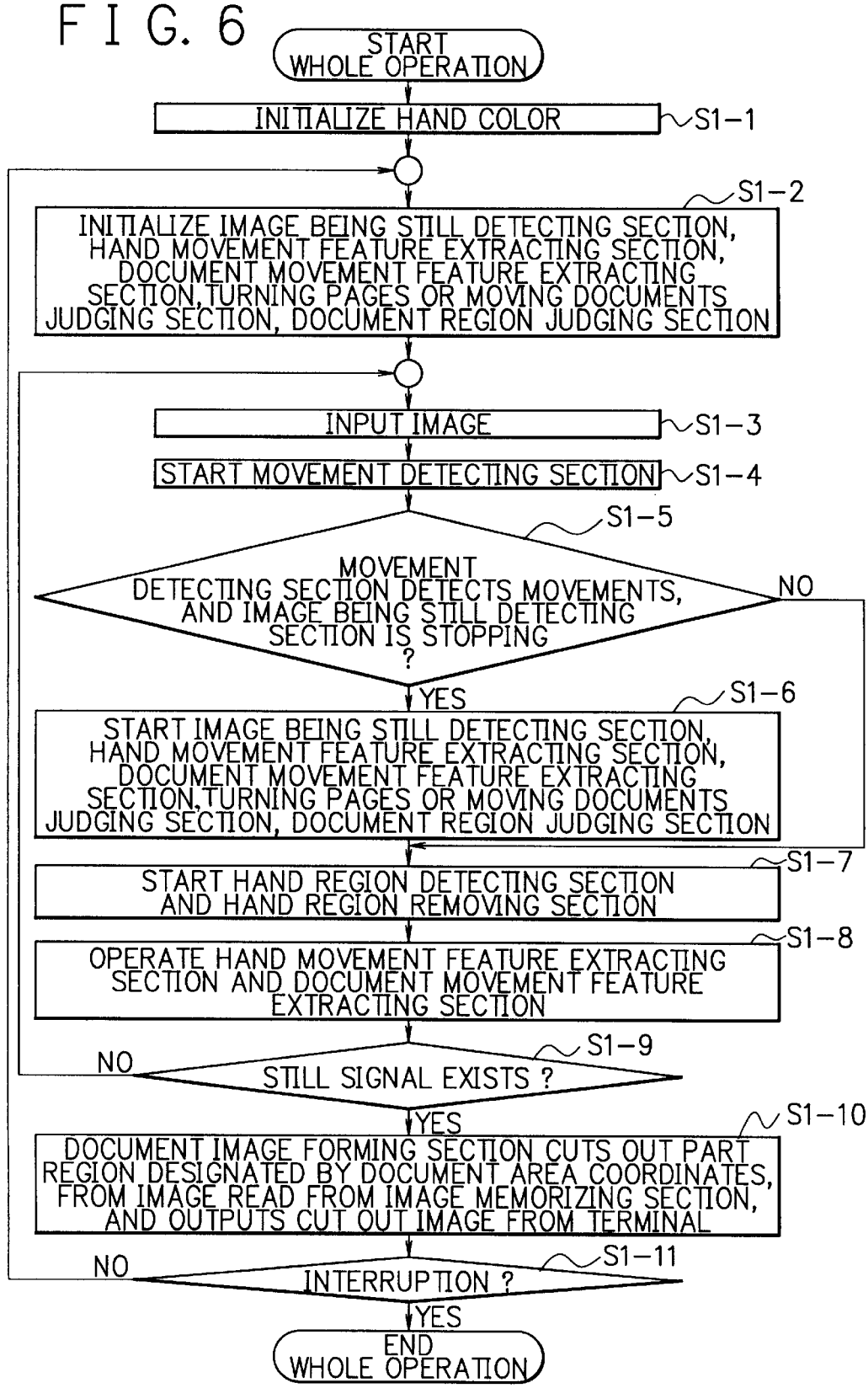
FIG. 6 is a flowchart showing the whole operation of the document image scanning apparatus of the present invention.
Figure 7:
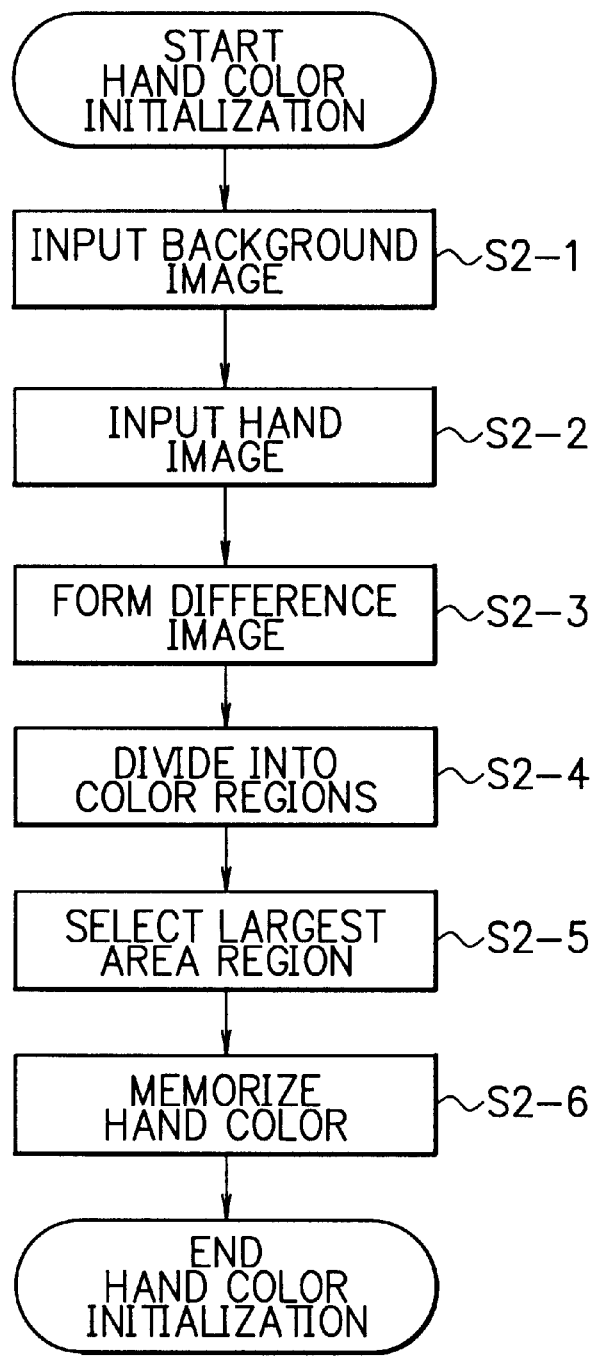
FIG. 7 is a flowchart showing an operation for initializing a hand color.

The whole structure of the document image scanning apparatus of the present invention was explained above. Next, the whole operation of the document image scanning apparatus of the present invention is explained in detail. FIG. 6 is a flowchart showing the whole operation of the document image scanning apparatus of the present invention. FIG. 7 is a flowchart showing an operation for initializing the hand color.

Referring to FIGS. 6 and 7, the operation is explained. In FIG. 6, soon after the document image scanning apparatus is started, the initialization of hand color is performed at step S1-1, and the hand color is memorized in the hand region detecting section 106.

Referring to FIG. 7, the initialization of the hand color is explained in detail. First, a background image is inputted corresponding to a first signal from the terminal 115 in a state that a hand does not exist, and the background image is memorized in the image memorizing section 103 (step S2-1). Next, a hand image is inputted at a state existing the hand corresponding to a second signal from the terminal 115 and the hand image is memorized in the image memorizing section 103 (step S2-2). These two images are transferred to the movement detecting section 104 and the hand region detecting section 106 in sequence. The movement detecting section 104 forms a difference image from these two images (step S2-3). The difference image is transferred from the movement detecting section 104 to the hand region detecting section 106. And a division into color regions is applied to the difference part in the difference image, and the difference part is divided into regions of similar colors at the hand region detecting section 106 (step S2-4). In this, areas of each region are investigated and a region having the largest area is selected (step S2-5). And the color of the largest area region is memorized in the hand region detecting section 106 (step S2-6), and the initialization of the hand color ends.

Next, as shown in FIG. 6, after the initialization of the hand color, the image being still detecting section 105, the hand movement feature extracting section 108, the document movement feature extracting section 109, the turning pages or moving documents judging section 110, and the document region judging section 111 are initialized (step S1-2).

After finishing the initialization, images are started to input and the images inputted at the image inputting section 101 are transferred and memorized in the image memorizing section 103 (step S1-3). Next, the movement detecting section 104 is started. And the movement detecting section 104 forms a difference image by taking the images from the image memorizing section 103, and transfers the difference image to the image being still detecting section 105, the hand region detecting section 106, and the hand region removing section 107 (step S1-4).

The movement detecting section 104 judges whether difference elements exist in the formed difference image or not, and regards that a movement exists in case that the difference elements exist, and also in case that the image being still detecting section 105 is stopping (YES of step S1-5), the movement detecting section 104 regards that the movement is detected, and starts the image being still detecting section 105, the hand movement feature extracting section 108, the document movement feature extracting section 109, the turning pages or moving documents judging section 110, and the document region judging section 111 (step S1-6).

The hand movement feature extracting section 108, the document movement feature extracting section 109, the turning pages or moving documents judging section 110, and the document region judging section 111 work continuously until a still signal is inputted from the image being still detecting section 105. If the image being still detecting section 105 is working or the movement of image is not detected (NO at step S1-5), the operation goes to step S1-7. And the hand region detecting section 106 is started and detects a similar region to the hand color memorized before, and transfers the similar region to the hand color to the hand region removing section 107. The hand region removing section 107 is started and removes the part corresponding to the inputted hand region from the difference image. The remaining difference image removed the hand region is transferred to the document movement feature extracting section 109 (step S1-7).

By inputting the hand region detected at the hand region detecting section 106 and the remaining difference image removed the hand region formed at the hand region removing section 107, the hand movement feature extracting section 108 and the document movement feature extracting section 109 are operated (step S1-8). The features formed at the hand movement feature extracting section 108 and the document movement feature extracting section 109 are transferred to the turning pages or moving documents judging section 110 and the document region judging section 111, information for the turning pages or moving documents judgement is formed, and information for the document region judgement is formed.

Next, whether the still signal from the image being still detecting section 105 is outputted or not is judged, and in case that the still signal is not outputted (NO at step S1-9), by judging that the documents are continuously moving, the operation returns to the step S1-3. And the operation of the steps from S1-3 to S1-9 are performed repeatedly. In case that the still signal is detected (YES at the step S1-9), the operation goes to step S1-10. The operation waits until the turning pages or moving documents judging section 110 and the document region judging section 111 stop, and after the operation stops, document region coordinates outputting from the document region judging section 111 are transferred to the document image forming section 112. The document image forming section 112 cuts out the part region designated by the document region coordinates from the image read from the image memorizing section 103, and outputs the cut out image from the terminal 113. After this, whether interruption to stop the operation from the terminal 114 is inputted or not is judged, in case that the interruption exists, the whole apparatus is stopped. If the interruption does not exist, the operation returns to the step S1-2, the operation of the steps from S1-2 to S1-11 are performed repeatedly, and another document image is taken and outputted from the terminal 113.

Figure 8:
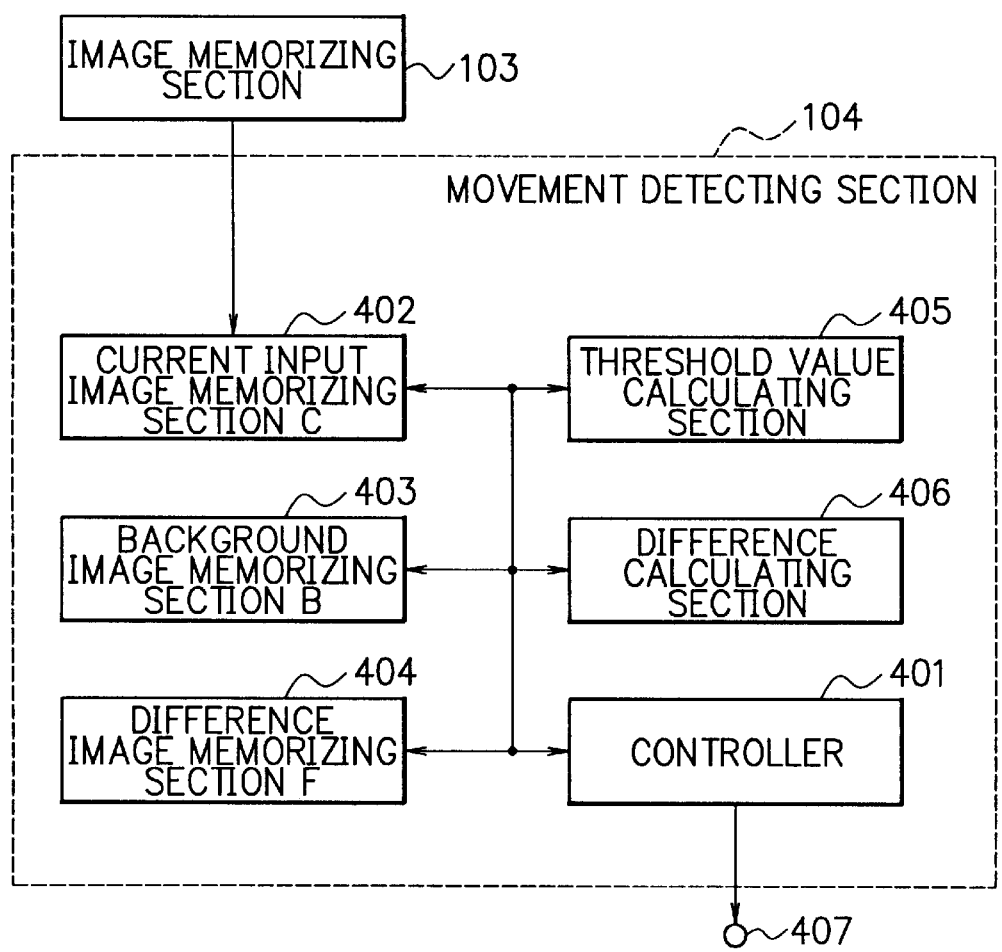
FIG. 8 is a block diagram showing a movement detecting section in the document image scanning apparatus of the present invention.

Next, referring to the drawings, the structure and operation of each section are explained in more detail. FIG. 8 is a block diagram showing the movement detecting section 104 in the document image scanning apparatus of the present invention. As shown in FIG. 8, the movement detecting section 104 consists of a controller 401, a current input image memorizing section 402, a background image memorizing section 403, a difference image memorizing section 404, a threshold value calculating section 405, and a difference calculating section 406. And further the movement detecting section 104 provides a terminal 407.

Figure 9:
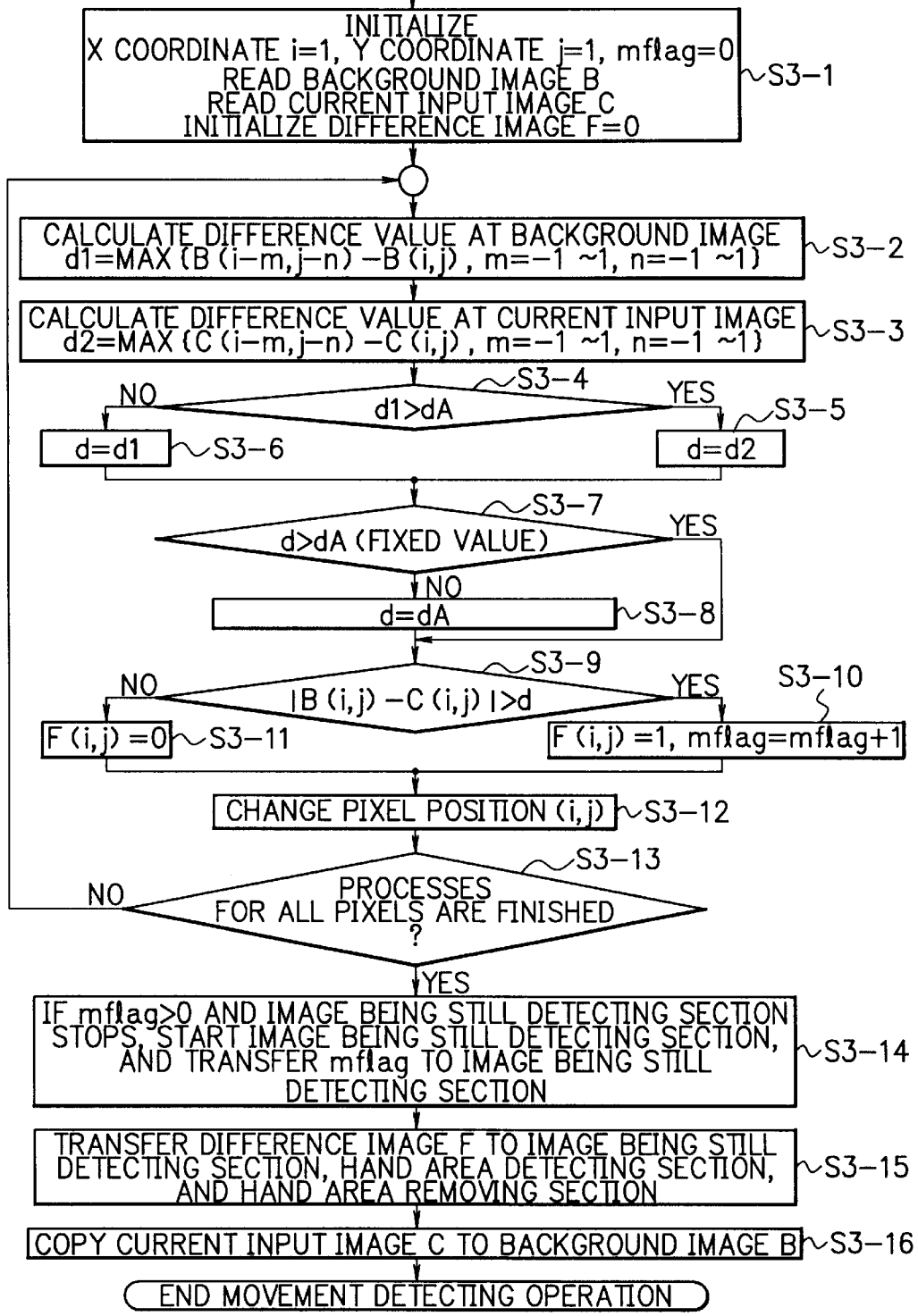
FIG. 9 is a flowchart showing an operation of the movement detecting section in the document image scanning apparatus of the present invention.

FIG. 9 is a flowchart showing an operation of the movement detecting section 104 in the document image scanning apparatus of the present invention. First, at the step S1-4 in the flowchart shown in FIG. 6, when the movement detecting section 104 is started, the controller 401 performs initialization (step S3-1). At this initialization, first, "i" being an index at X coordinate is set to "1" and "j" being an index at Y coordinate is set to "1", and "mflag" being a counter for detecting the movement is set to "0", and a gray scale image is read from the image memorizing section 103 and this read image is memorized in the current input image memorizing section 402. And all pixel values of the difference image F are set to "0".

In this, it is set that a previous image has been already memorized in a background image B. At the embodiment of present invention, the value of each pixel of the gray scale image takes an integer from 0 to 255, however this is not an essential matter. And the size of the image consists of M pixels to the X direction and N pixels to the Y direction. At the embodiment of the present invention, it is set that the M is 320 pixels and the N is 240 pixels, however, this is not an essential matter, any values can be used.

After this, at steps from S3-2 to S3-13 in FIG. 9, difference values for all pixels in the inputted image are calculated and a difference image is formed.

First, the threshold value calculating section 405 is started, and a threshold value for calculating the difference value is calculated. This procedure is explained based on the steps from S3-2 to S3-8 in FIG. 9. First, at the step S3-2, the difference values between a pixel and adjacent pixels to the pixel are calculated at the background image. In this case, the coordinate of the pixel is defined as (i, j), and the coordinates of each of adjacent eight pixels are defined as {(i−m, j−n), m=−1~1, n=−1~1}, and values of all these pixels are read from the background image memorizing section 403. The difference between the pixel (i, j) and the pixels (i−m, j−n) is calculated by using the following equation (1) and memorized.

$$D(m, n)=B(i-m, j-n)-B(i, j) \quad (1)$$

And, the maximum value in the set D(m, n) is defined as "d1".

At the step S3-3, for the current input image, after reading the value of the pixel from the current input image memorizing section 402, the difference between the value of the pixel and the adjacent pixels to the pixel is calculated by using the following equation (2). In this case, the coordinate of the pixel is defined as (i, j), and the coordinates of each of adjacent eight pixels are defined as {(i−m, j−n), m=−1~1, n=−1~1}, and values of all these pixels are read from the current input image memorizing section 402. The difference value between the pixel (i, j) and the pixels (i−m, j−n) is calculated by using the following equation (2). In this calculation, in case that the positions of the pixels (i−m, j−n) deviate from the range of the image, the calculation is not performed and D(m, n) is made to be "0".

$$D(m, n)=C(i-m, j-n)-C(i, j) \quad (2)$$

And, the maximum value in the set D(m, n) is defined as "d2".

Next, in the steps from S3-4 to S3-6, the threshold value is made to be "d" by selecting a smaller value in the "d1" and "d2". And at the steps from S3-7 to S3-8, if the "d" is smaller than a fixed value "dA", the threshold value "d" is made to be "dA". If not, the threshold value "d" is made to be the value decided at the steps from S3-4 to S3-6. The decided threshold value "d" is transferred to the difference calculating section 406. At the embodiment of the present invention, the "dA" is made to be "10", however this is not an essential matter and any value can be used. However, at the calculation mentioned above, in case that the positions of the pixels (i−m, j−n) deviate from the range of the image, the calculation is not performed and D(m, n) is made to be "0".

Next, the difference calculating section 406 is started. The procedure of operation of the difference calculating section 406 is shown in steps from S3-9 to S3-11 in FIG. 9. At these steps, the values of the current input image and the background image of the pixel of the coordinate (i, j) are read from the current input image memorizing section 402 and the background image memorizing section 403 respectively, the difference of them is calculated by using the following equation (3).

$$D(i, j)=|C(i, j)-B(i, j)| \quad (3)$$

This difference value D(i, j) is compared with the threshold value "d" mentioned above, in case that the difference value D(i, j) is larger than the threshold value "d" (YES at the step S3-9), the pixel value F(i, j) of the pixel of the difference image F is made to be "1" (step S3-10). In this case, "1" is added to a difference pixel counter "mflag". And in case that the difference value D(i, j) is smaller than the threshold value "d" (NO at the step S3-9), the pixel value F(i, j) of the pixel of the difference image F is made to be "0"

(step S3-11). The calculated difference value F(i, j) is transferred to the difference image memorizing section 404 and memorized.

Next, at step S3-12, the position of pixels is changed. Any order to change the position of pixels can be applied, at the embodiment of the present invention, the position of pixels is changed by adding "1" to "i". However, in case that the "i" is at the right end, that is, the "i" equals M, "1" is added to "j" and "i" is set to "1".

After changed the position of pixels, it is judged whether all pixels are processes or not at step S3-13, and in case that the processes for all pixels are finished (YES at the step S3-13), the operation goes to step S3-14. And in case that the processes for all pixels are not finished (NO at the step S3-13), for the changed pixel position, a series of the processes, the steps from the step S3-2 to S3-13, is performed again.

At the embodiment of the present invention, when the "i" becomes "1" and "j" becomes N+1, it is judged that all pixels are processed. In case that this condition is satisfied, the process goes to the step S3-14.

At the step S3-14, in case that the difference pixel counter value "mflag" from the difference calculating section 406 is larger than "0", the controller 401 judges that a movement existed in the current input image, and if the image being still detecting section 105 stops, the controller 401 makes the image being still detecting section 105 start via the terminal 407. And by considering the image being still detecting section 105 has been already started, the controller 401 transfers the difference pixel counter value "mflag" to the image being still detecting section 105. Next, at step S3-15, the controller 401 reads the difference image F from the difference image memorizing section 404 and transfers the difference image F to the image being still detecting section 105, the hand region detecting section 106, and the hand region removing section 107 via the terminal 407. Further, at the step S3-16, the controller 401 reads the current input image C from the current input image memorizing section 402 and makes the current input image C memorize in the background image memorizing section 403, and stops the operation of the movement detecting section 104.

Referring to the drawings, the structure and operation of the image being still detecting section 105 are explained in more detail. FIG. 10 is a block diagram showing the image being still detecting section 105 in the document image scanning apparatus of the present invention. As shown in FIG. 10, the image being still detecting section 105 consists of a still number counter 501, a pixel number counter 502, and a controller 503. And further the image being still detecting section 105 provides a terminal 505 and connects to the terminal 407 of the movement detecting section 104.

Figure 11:
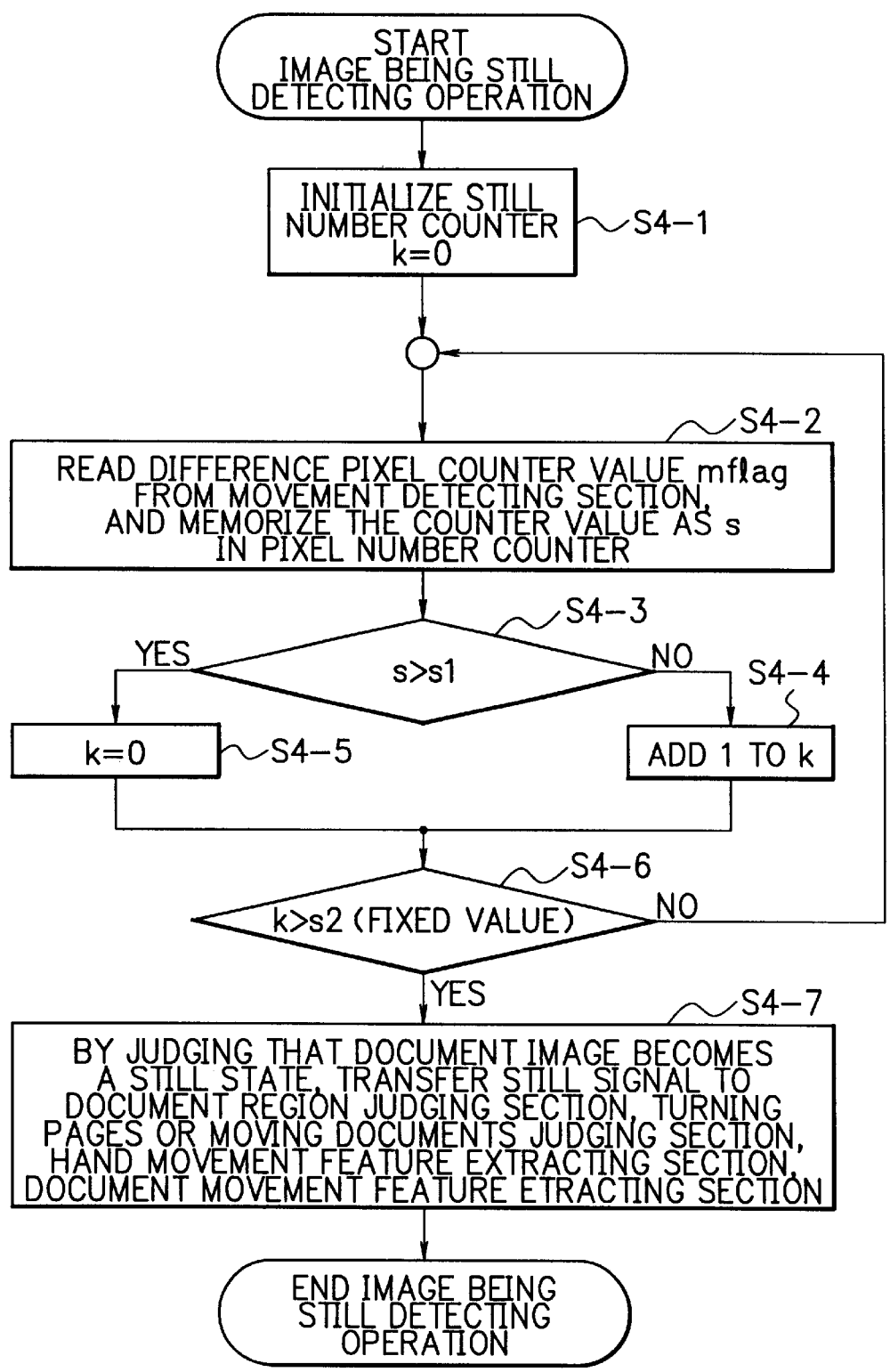
FIG. 11 is a flowchart showing an operation of the image being still detecting section in the document image scanning apparatus of the present invention.

FIG. 11 is a flowchart showing an operation of the image being still detecting section 105 in the document image scanning apparatus of the present invention. First, when the image being still detecting section 105 is started by receiving a starting signal from the movement detecting section 104 in FIG. 3 via the terminal 407, "0" is written in the still number counter 501 as initialization at step S4-1, that is "k=0". Next, at step S4-2, the difference pixel counter value "mflag" transferred from the movement detecting section 104 via the terminal 407 is read and memorized in the pixel number counter 502 as the value is "s".

At step S4-3, the controller 503 reads the pixel number counter value "s" from the pixel number counter 502 and compares the pixel number counter value "s" with the threshold value "s1". In case that the pixel number counter value "s" is larger than the threshold value "s1" (YES at the step S4-3), the controller 503 writes "0" to the still number counter 501 at step S4-5, that is, "k=0". In case that the pixel number counter value "s" is smaller than the threshold value "s1" (NO at the step S4-3), the controller 503 makes the value "k" of the still number counter 501 count up by "1" at step S4-4. At the embodiment of the present invention, the threshold value "s1" is made to be 100, however this value is not an essential value, any value can be applied.

Next, the controller 503 reads the value "k" of the still number counter 501 and compares the value "k" with a threshold value "s2" at step S4-6, in this, the threshold value "s2" is a fixed value. In case that the still number counter value "k" is smaller than the threshold value "s2" (NO at the step S4-6), the operation returns to the step S4-2, and the controller 503 waits for transferring the difference pixel counter value "mflag" from the movement detecting section 104. In case that the still number counter value "k" is larger than the threshold value "s2" (YES at the step S4-6), the controller 503 judges that the document image becomes a still state at step S4-7. And the controller 503 outputs a still signal to the document region judging section 111, the turning pages or moving documents judging section 110, the hand movement feature extracting section 108, and the document movement feature extracting section 109 via the terminal 505, and the controller 503 stops the operation.

The conventional document image scanning apparatus detects a case that an operator takes the hand off the document. However, the document image scanning apparatus of the present invention obtains a document image by detecting that the movement of an input image stops, therefore even at the case that the hand does not take off the document, the document image can be obtained.

Figure 12:
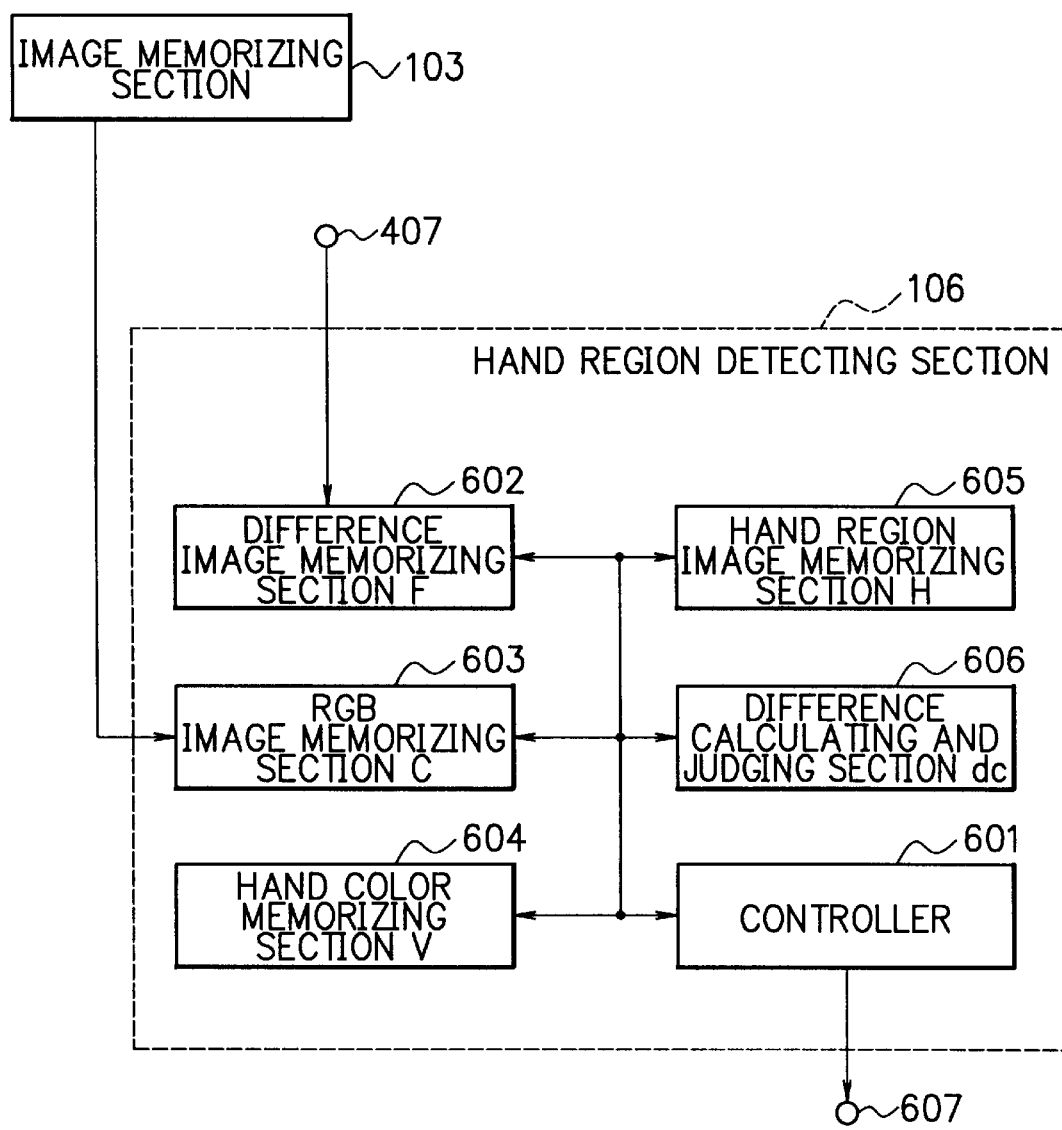
FIG. 12 is a block diagram showing a hand region detecting section in the document image scanning apparatus of the present invention.

Referring to the drawings, the structure and operation of the hand region detecting section 106 are explained in more detail. FIG. 12 is a block diagram showing the hand region detecting section 106 in the document image scanning apparatus of the present invention. As shown in FIG. 12, the hand region detecting section 106 consists of a controller 601, a difference image memorizing section 602, an RGB image memorizing section 603, a hand color memorizing section 604, a hand region image memorizing section 605, and a difference calculating and judging section 606. And further the hand region detecting section 106 provides a terminal 607, and connects to the terminal 407.

Figure 13:
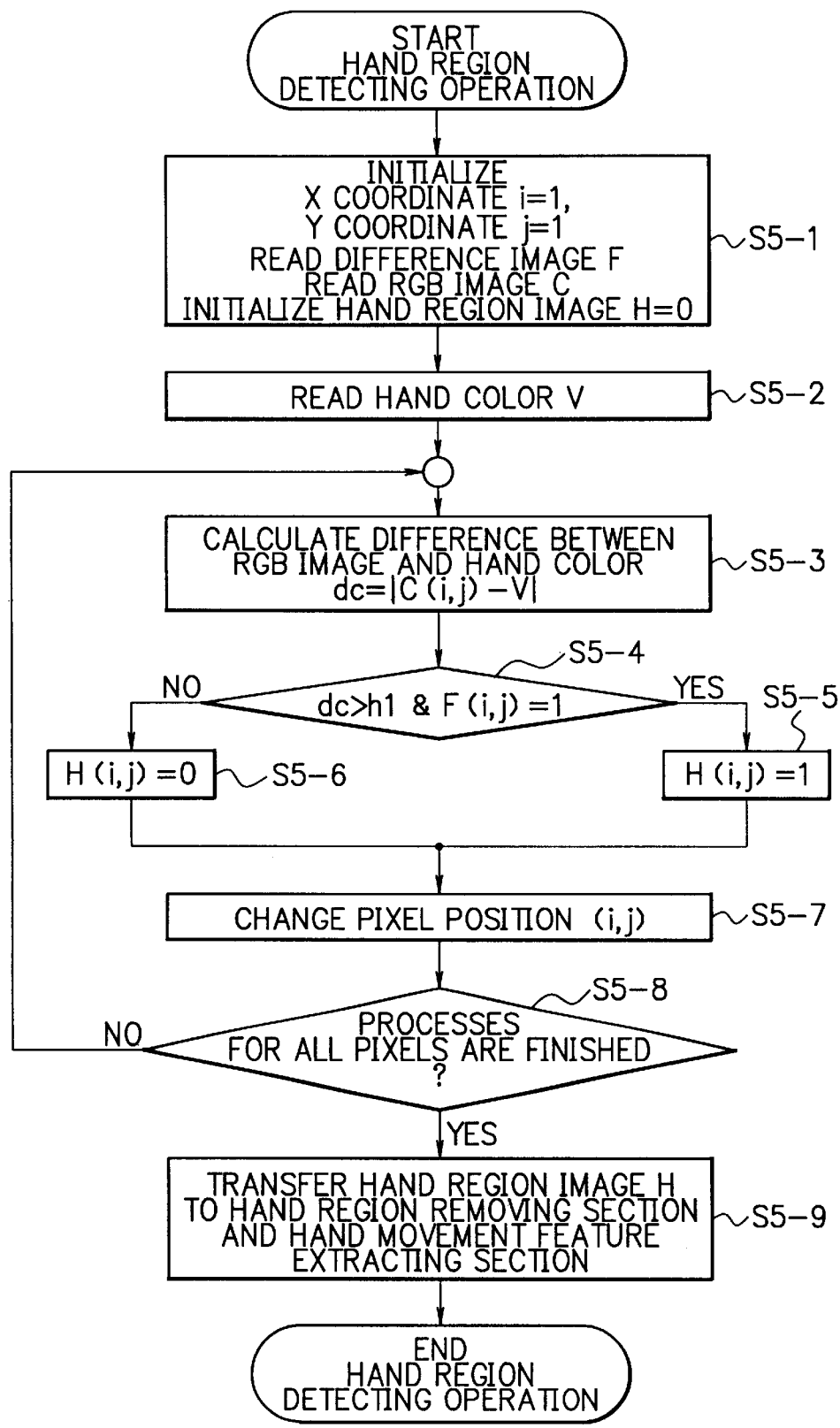
FIG. 13 is a flowchart showing an operation of the hand region detecting section in the document image scanning apparatus of the present invention.

FIG. 13 is a flowchart showing an operation of the hand region detecting section 106 in the document image scanning apparatus of the present invention. First, the hand region detecting section 106 is started at the time when the difference image F is inputted from the movement detecting section 104 via the terminal 407. At step S5-1, the inputted difference image F is memorized in the difference image memorizing section 602 through an initialization process. And a red image, a green image, and a blue image are read from the image memorizing section 103, and the read image is memorized in the RGB image memorizing section 603 as an RGB image C. And at the hand region image memorizing section 605, all pixel values of an hand region image H are made to be "0". And X coordinate index "i" and Y coordinate index "j" having in the controller 601 are set to "1" respectively. At the embodiment of the present invention, the value of each pixel of the red image, the green image, and the blue image is an integer from "0" to 255, however this is not an essential matter. And the size of each of all images is M pixels to the X direction and N pixels to the Y direction. At the embodiment of the present invention, M is made to be 320 pixels and N is made to be 240 pixels, however this is not an essential matter, any value can be applied.

Next, at step S5-2, a hand color V is read from the hand color memorizing section 604 and is transferred to the difference calculating and judging section 606. And at step S5-3, the controller 601 reads the RGB image C(i, j) from the RGB image memorizing section 603 as a pixel value of the coordinate (i, j), and the read RGB image C is transferred to the difference calculating and judging section 606. The difference calculating and judging section 606 calculates the difference between the RGB image C and the hand color V, and the calculated difference is made to be "dc". At the embodiment of the present invention, in the RGB image C, the red pixel value is made to be R1, the green pixel value is made to be G1, and the blue pixel value is made to be B1. And in the hand color V, the red color value is made to be VR, the green color value is made to be VG, and the blue color value is made to be VB. And the difference "dc" is calculated by the following equation (4). However any other calculation method can be applied.

$$dc = \mathrm{SQRT}((R-VR)^2 + (G1-VG)^2 + (B1-VB)^2) \qquad (4)$$

In this, SQRT means a square root.

Next, the controller 601 reads a difference image value F(i, j) of the pixel (i, j) from the difference image memorizing section 602 and transfers the read difference image pixel value F to the difference calculating and judging section 606. At step S5-4, the difference calculating and judging section 606 compares the difference "dc" with a threshold value "h1". And the difference calculating and judging section 606 judges whether the difference "dc" is larger than the threshold value "h1" and the read difference image pixel value F(i, j) is "1" or not. In case that the difference "dc" is larger than the threshold value "h1" and the read difference image pixel value F(i, j) is "1" (YES at the step S5-4), at step S5-5, the hand region image pixel value H(i, j) is made to be "1".

In case that the difference "dc" is smaller than the threshold value "h1" or that the read difference image pixel value F(i, j) is not "1" (NO at the step S5-4), at step S5-6, the pixel value H(i, j) of the hand region image is made to be "0". And the controller 601 transfers the pixel value H(i, j) of the hand region image to the hand region image memorizing section 605 and makes the value H(i, j) memorize. At the embodiment of the present invention, the threshold value "h1" is made to be 30, however this is not an essential matter.

Next, at the step S5-7, the position of pixels is changed. Any order to change the position of pixels can be applied, at the embodiment of the present invention, the position of pixels is changed by adding "1" to "i". However, in case that the "i" is at the right end, that is, the "i" equals M, "1" is added to "j" and "i" is set to "1".

After changed the position of pixels, it is judged whether all pixels are processed or not at step S5-8. In case that the processes for all pixels are finished (YES at the step S5-8), the operation goes to step S5-9. If the processes for all pixels are not finished (NO at the step S5-8), a series of processes from step S5-3 to S5-8 are performed again for the changed position of pixels. At the embodiment of the present invention, when "i" becomes "1" and "j" becomes N+1, it is defined that the all pixels are processed. In case that this condition is satisfied, the operation goes to step S5-9.

At the step S5-9, the controller 601 reads the hand region image H from the hand region image memorizing section 605 and transfers the hand region image H to the hand movement feature extracting section 108 and the hand region removing section 107. And the controller 601 stops the operation of the hand region detecting section 106.

Figure 14:
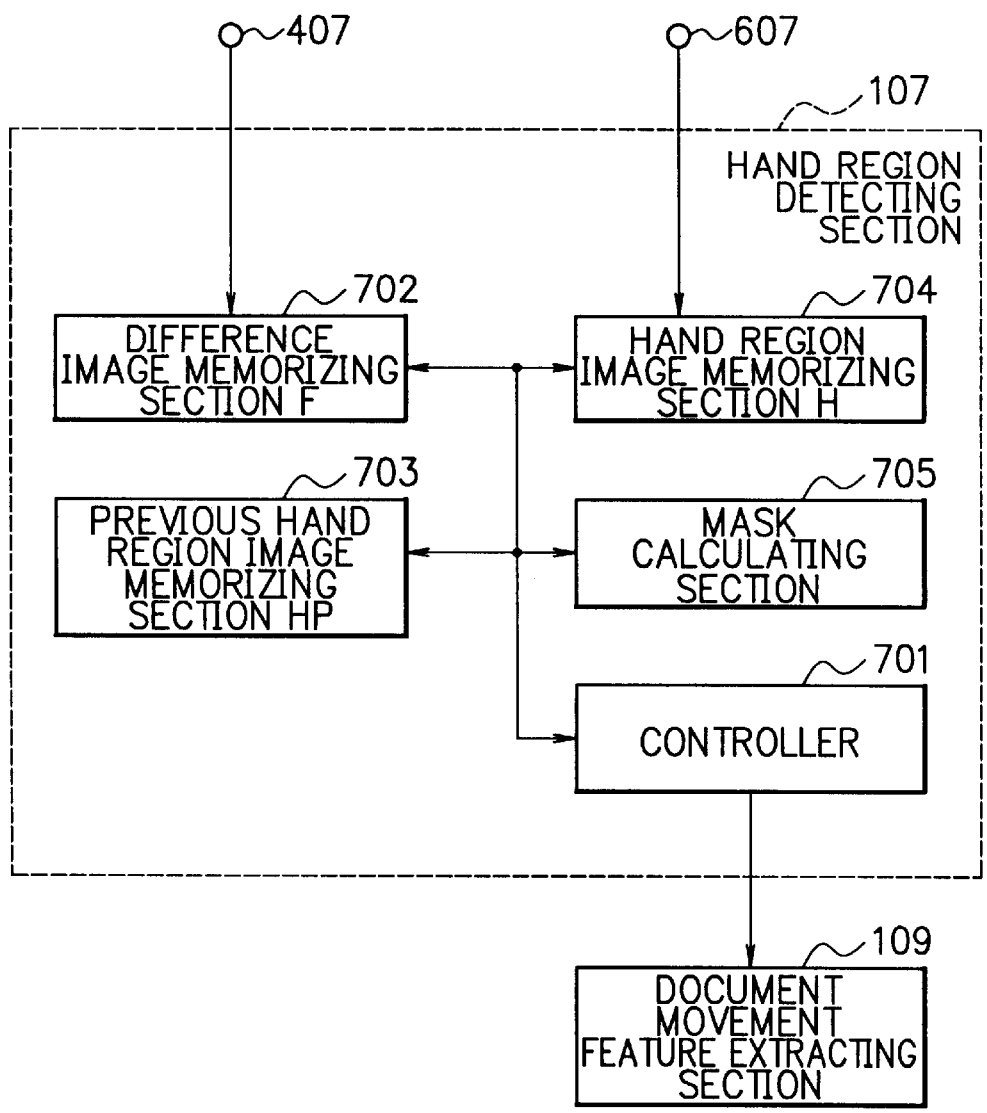
FIG. 14 is a block diagram showing a hand region removing section in the document image scanning apparatus of the present invention.

Referring to the drawings, the structure and operation of the hand region removing section 107 are explained in more detail. FIG. 14 is a block diagram showing the hand region removing section 107 in the document image scanning apparatus of the present invention. As shown in FIG. 14, the hand region removing section 107 consists of a controller 701, a difference image memorizing section 702, a previous hand region image memorizing section 703, a hand region image memorizing section 704, and a mask calculating section 705. And further the hand region removing section 107 connects to the terminals 407 and 607.

Figure 15:
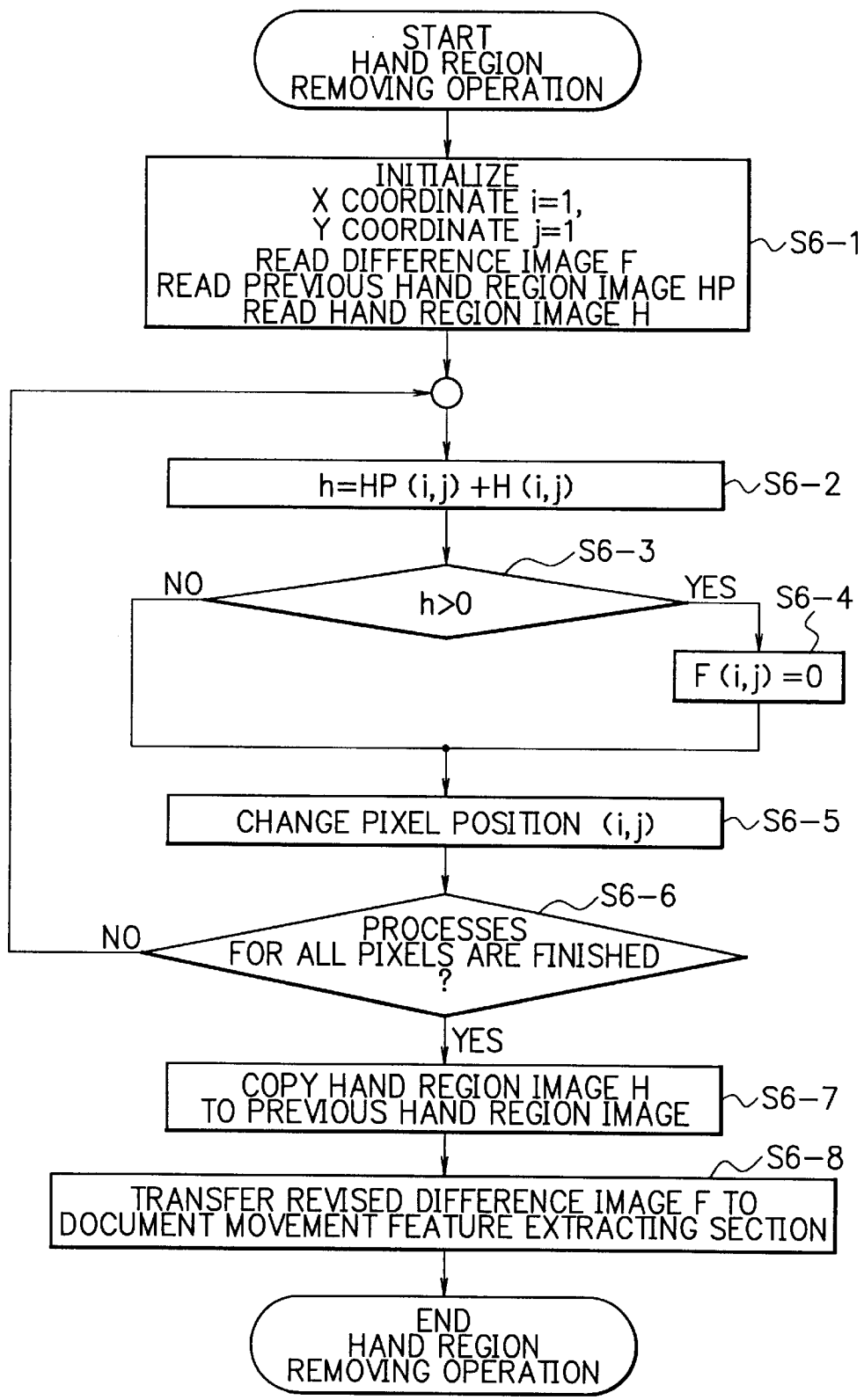
FIG. 15 is a flowchart showing an operation of the hand region removing section in the document image scanning apparatus of the present invention.

FIG. 15 is a flowchart showing an operation of the hand region removing section 107 in the document image scanning apparatus of the present invention. First, the hand region removing section 107 is started at the time when the hand region image H is inputted from the hand region detecting section 106 via the terminal 607. At step S6-1, the inputted hand region image H is memorized in the hand region image memorizing section 704. And the difference image memorizing section 702 reads the difference image F from the movement detecting section 104 via the terminal 407 and the difference image F is memorized in the difference image memorizing section 702. And a previous hand region image HP has been already memorized in the previous hand region image memorizing section 703. And X coordinate index "i" and Y coordinate index "j" having in the controller 701 are set to "1" respectively. At the embodiment of the present invention, the size of each of all images is M pixels to the X direction and N pixels to the Y direction. At the embodiment of the present invention, M is made to be 320 pixels and N is made to be 240 pixels, however this is not an essential matter, any value can be applied.

Next, at step S6-2, the controller 701 reads the pixel value H(i, j) of the coordinate (i, j) from the hand region image memorizing section 704 and transfers the read pixel value H to the mask calculating section 705. And the controller 701 reads the pixel value HP(i, j) of the coordinate (i, j) from the previous hand region image memorizing section 703 and transfers the read pixel value HP to the mask calculating section 705. And the mask calculating section 705 adds the inputted pixel value H(i, j) and HP(i, j), and makes the added result "h".

At step S6-3, if the added result "h" is larger than "0", at step S6-4, the difference image pixel value F(i, j) of the pixel is made to be "0" and transferred to the controller 701. The controller 701 writes the difference image pixel value F(i, j) in the pixel (i, j) of the difference image memorizing section 702.

Next, at step S6-5, the position of pixels is changed. Any order to change the position of pixels can be applied, at the embodiment of the present invention, the position of pixels is changed by adding "1" to "i". However, in case that the "i" is at the right end, that is, the "i" equals M, "1" is added to "j" and "i" is set to "1".

After changed the position of pixels, it is judged whether all pixels are processed or not at step S6-6. In case that the processes for all pixels are finished (YES at the step S6-6), the operation goes to step S6-7. If the processes for all pixels are not finished (NO at the step S6-6), a series of processes from step S6-2 to S6-6 are performed again for the changed position of pixels. At the embodiment of the present invention, when "i" becomes "1" and "j" becomes N+1, it is defined that the all pixels are processed. In case that this condition is satisfied, the operation goes to step S6-7.

At step S6-7, the controller 701 transfers the images memorized in the hand region image memorizing section 704 to the previous hand region image memorizing section 703. And at step S6-8, the controller 701 transfers the revised difference image F from the difference image memorizing section 702 to the document movement feature extracting section 109. And the controller 701 stops the operation of the hand region removing section 107.

Figure 16:
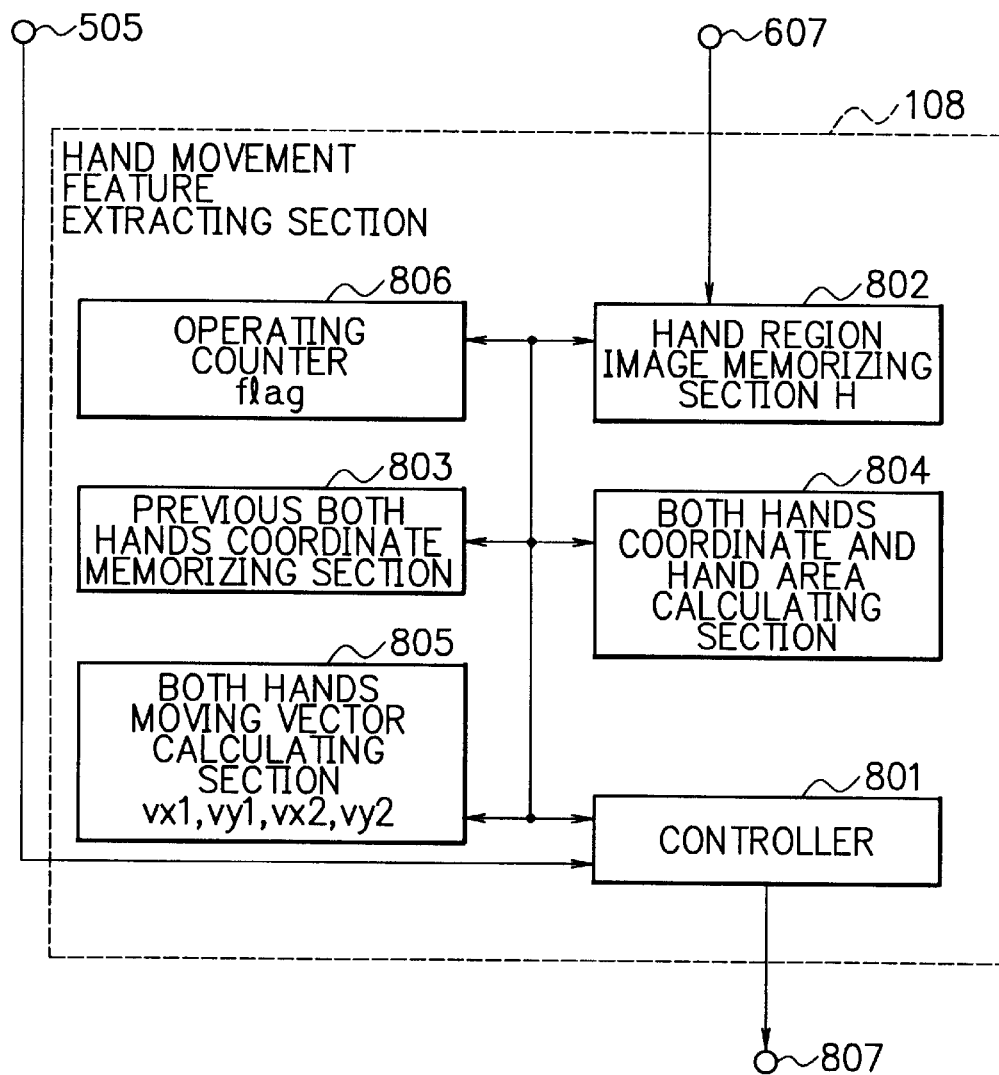
FIG. 16 is a block diagram showing a hand movement feature extracting section in the document image scanning apparatus of the present invention.

Referring to the drawings, the structure and operation of the hand movement feature extracting section 108 are explained in more detail. FIG. 16 is a block diagram showing the hand movement feature extracting section 108 in the document image scanning apparatus of the present invention. As shown in FIG. 16, the hand movement feature extracting section 108 consists of a controller 801, a hand region image memorizing section 802, a previous both hands coordinate memorizing section 803, a both hands coordinate and hand area calculating section 804, a both hands moving vector calculating section 805, and an operating counter 806. And further the hand movement feature extracting section 108 provides a terminal 807 and connects to terminals 505 and 607.

Figure 17:
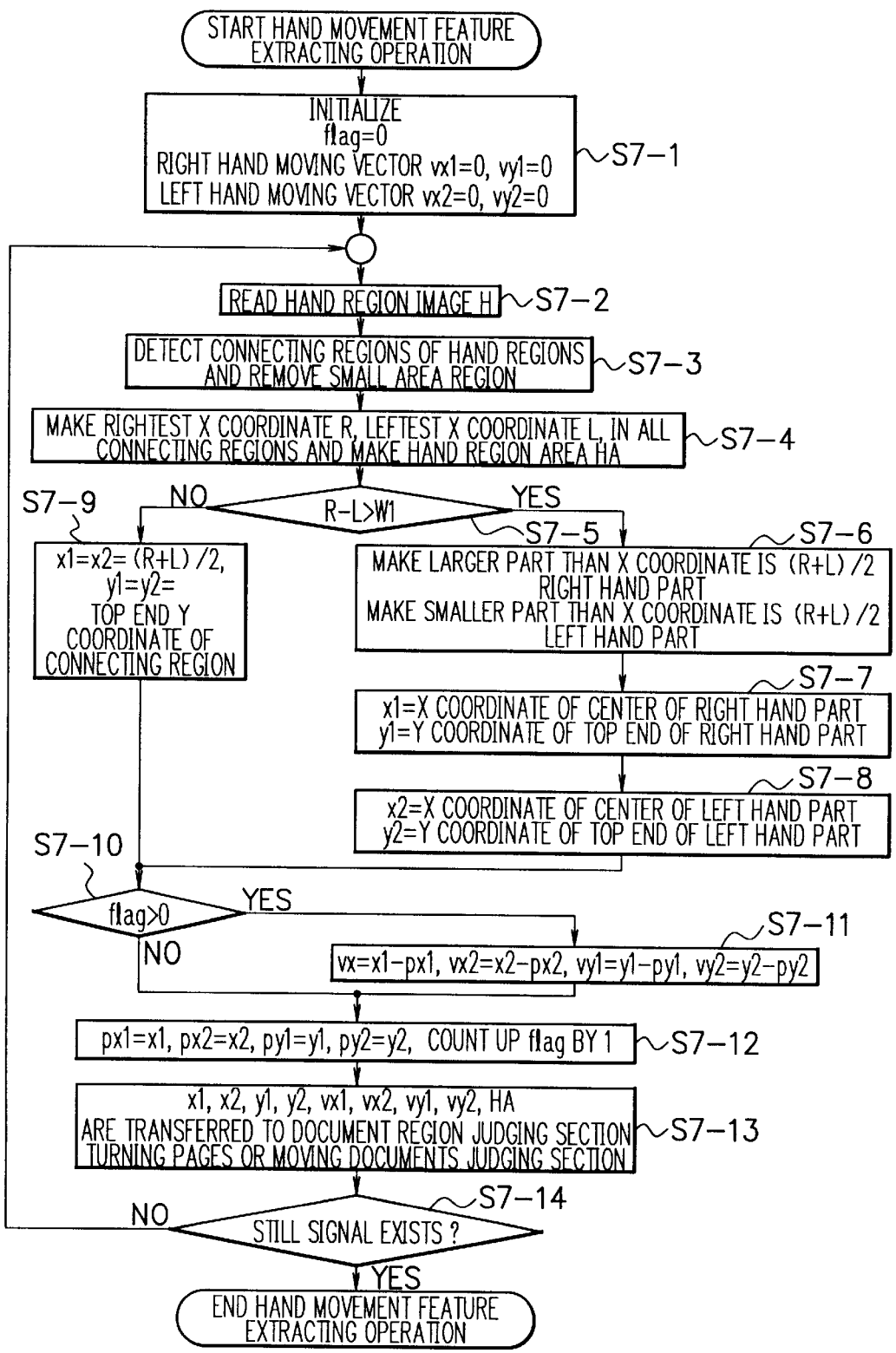
FIG. 17 is a flowchart showing an operation of the hand movement feature extracting section in the document image scanning apparatus of the present invention.

FIG. 17 is a flowchart showing an operation of the hand movement feature extracting section 108 in the document image scanning apparatus of the present invention. First, the hand movement feature extracting section 108 is started at the time of the step S1-6 with the image being still detecting section 105. At this time, the controller 801 sets "0" to the operating counter value "flag" of the operating counter 806, and also sets (0, 0) to a right hand moving vector (vx1, vy1) and (0, 0) to a left hand moving vector (vx2, vy2) in the both hands moving vector calculating section 805, at step S7-1.

Next, the operation waits until a hand region image H is inputted from the terminal 607. At the time when the hand region image H is inputted from the hand region detecting section 106 via the terminal 607, the controller 801 makes the inputted hand region image H memorize in the hand region image memorizing section 802 at step S7-2.

At step S7-3, the controller 801 reads the hand region image H from the hand region image memorizing section 802, and detects a connecting region and removes a small area region being less than a threshold value. And the controller 801 returns the resulted hand region image H to the hand region image memorizing section 802 and makes it memorize in the hand region image memorizing section 802. The method detecting the connecting region is well known, for example, a method is described in "The electronics information and communication handbook" pp. 1106, section 5.1.2, 1998, published by "The Institute of Electronics Information and Communication Engineers." This method forming a connecting region is not directly related to the present invention, therefore the detail structure is omitted. The area of the connecting region is expressed by the number of pixels having the value "1" included in the connecting region. In case that the area of the connecting region is smaller than a threshold value, a pixel having a pixel value "1" in the connecting region is changed to be the value "0". This process is applied to the all connecting region. At the embodiment of the present invention, the threshold value, by which the removing the connecting region is judged, is set to 10 pixels, however this value is not an essential matter, and any value can be applied.

Next, at step S7-4, the controller 801 makes the both hands coordinate and hand area calculating section 804 start. The hand region image H is read from the hand region image memorizing section 802. And a X coordinate of a pixel having the smallest X coordinate (most left) in all pixels having value "1" is made to be L, and a X coordinate of a pixel having the largest X coordinate (most right) in all pixels having value "1" is made to be R. Further, the both hands coordinate and hand area calculating section 804 counts the number of pixels that have the value "1" included in the hand region image H, and memorizes the counted number as a hand region area HA.

At step S7-5, the both hands coordinate and hand area calculating section 804 calculates "R−L". In case that the calculated value is larger than a threshold value W1 (YES at the step S7-5), the both hands coordinate and hand area calculating section 804 judges that both right and left hands are included in the hand area at step S7-6. And pixels whose X coordinates are larger than (R+L)/2 are made to be a right hand part, and pixels whose X coordinates are smaller than (R+L)/2 are made to be a left hand part. At the embodiment of the present invention, the threshold value W1 is made to be 100, however, this value is not an essential matter, any value can be applied.

At step S7-7, the both hands coordinate and hand area calculating section 804 calculates a right hand part center coordinate "x1" by an expression (XR1+XL1)/2 from the X coordinate XR1 of the most right pixel and the X coordinate XL1 of the most left pixel, in a pixel set having the pixel value "1" included in the right hand part, and memorizes the calculated result. And the both hands coordinate and hand area calculating section 804 memorizes a right hand part top coordinate "y1" that is a Y coordinate of a pixel having the smallest Y coordinate, that is, at the top, in a pixel set having the pixel value "1" included in the right hand part.

At step S7-8, the both hands coordinate and hand area calculating section 804 calculates a left hand part center coordinate "x2" by an expression (XR2+XL2)/2 from the X coordinate XR2 of the most right pixel and the X coordinate XL2 of the most left pixel, in a pixel set having the pixel value "1" included in the left hand part, and memorizes the calculated result. And the both hands coordinate and hand area calculating section 804 memorizes a left hand part top coordinate "y2" that is a Y coordinate of a pixel having the smallest Y coordinate, that is, at the top, in a pixel set having the pixel value "1" included in the left hand part.

At the step S7-5, in case that the value "R−L" is smaller than the threshold value W1 (NO at the step S7-5), the both hands coordinate and hand area calculating section 804 judges that only one hand is detected at step S7-9. And the right hand part center coordinate "x1" and the left hand part center coordinate "x2" are judged as the same (R+L)/2 expediently and memorized. And the right hand part top coordinate "y1" and the left hand part top coordinate "y2" are also judged as the same value and memorized. The same value is the Y coordinate of the pixel having the smallest Y coordinate, that is, at the top, in pixels having the pixel value "1" included in the hand region image H.

At step S7-10, the controller 801 reads the value "flag" of the operating counter 806, only in case that the value "flag" is larger than "0" (YES at the step S7-10), the both hands moving vectors are calculated in the following equations (5).

$$vx1 = x1 - px1$$

$$vy1 = y1 - py1$$

$$vx2 = x2 - px2$$

$$vy2 = y2 - py2 \qquad 5)$$

At this calculation, the right hand coordinate (x1, y1) and the left hand coordinate (x2, y2) are read from the both hands coordinate and hand area calculating section 804, and the previous right hand coordinate (px1, py1) and the previous left hand coordinate (px2, py2) are read from the previous both hands coordinate memorizing section 803.

At step S7-12, the controller 801 reads the right hand coordinate (x1, y1) and the left hand coordinate (x2, y2) from the both hands coordinate and hand area calculating section 804, and makes the read values memorize in the previous both hands coordinate memorizing section 803 as the previous right hand coordinate (px1, py1) and the previous left hand coordinate (px2, py2). And the value "flag" of the operating counter 806 is counted up by "1".

At step S7-13, the controller 801 reads the right hand coordinate (x1, y1) and the left hand coordinate (x2, y2) from the both hands coordinate and hand area calculating section 804, and outputs the read values from the terminal 807. Further, the controller 801 reads the right hand moving vector (vx1, vy1) and the left hand moving vector (vx2, vy2) from the both hands moving vector calculating section 805, and reads the hand region area HA from the both hands coordinate and hand area calculating section 804. And the controller 801 transfers the read values from the terminal 807 to the document region judging section 111 and the turning pages or moving documents judging section 110.

At step S7-14, the controller 801 judges whether a still signal from the image being still detecting section 105 via the terminal 505 exists or not. In case that the still signal exists (YES at the step S7-14), the controller 801 stops the operation of the hand movement feature extracting section 108. In case that the still signal does not exist (NO at the step S7-14), the operation returns to the step S7-2 and waits until a hand region image H is inputted from the terminal 607, in case that the hand region image H is inputted, the operation from the step S7-2 to S7-14 is repeated.

Figure 18:
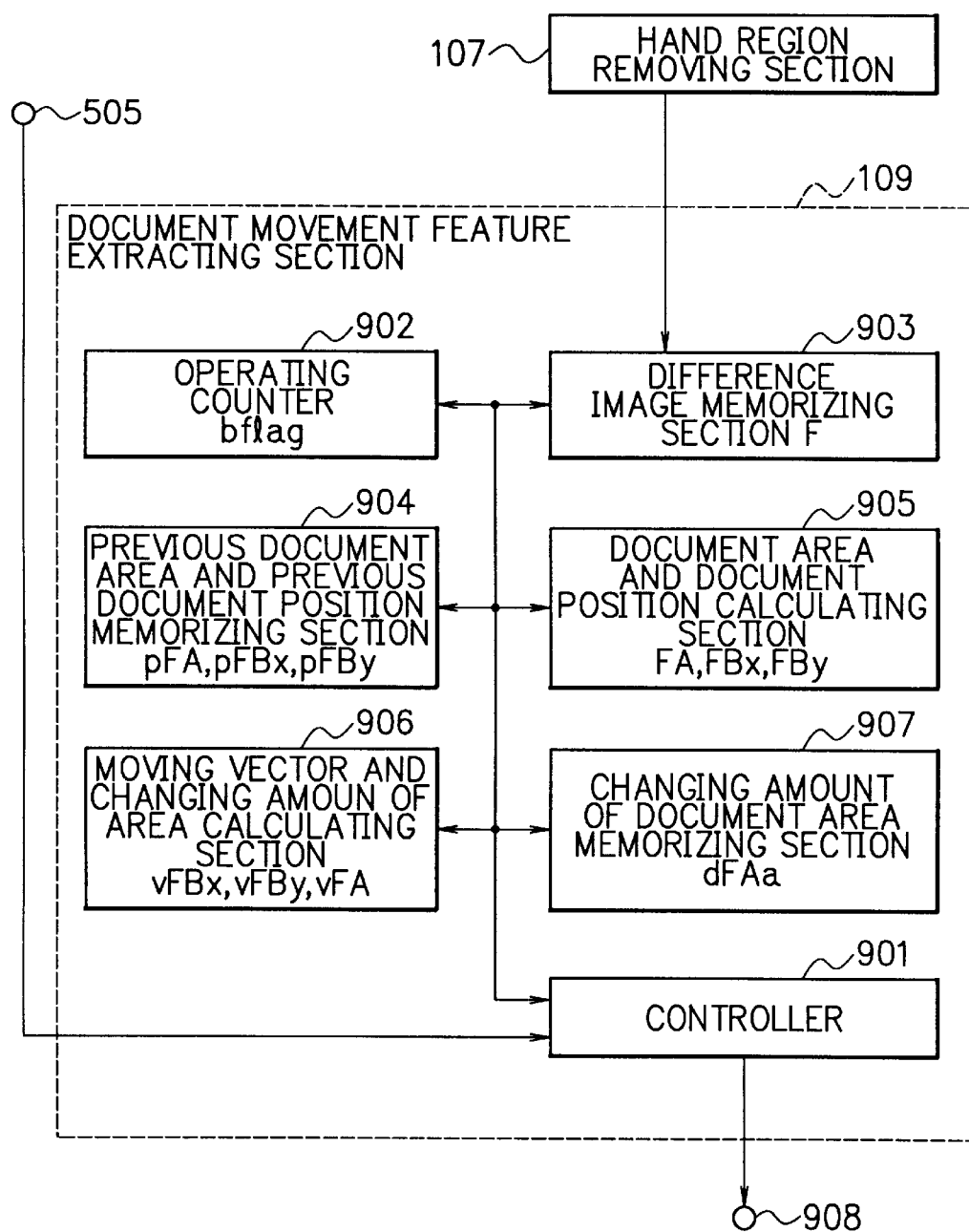
FIG. 18 is a block diagram showing a document movement feature extracting section in the document image scanning apparatus of the present invention.

Referring to the drawings, the structure and operation of the document movement feature extracting section 109 are explained in more detail. FIG. 18 is a block diagram showing the document movement feature extracting section 109 in the document image scanning apparatus of the present invention. As shown in FIG. 18, the document movement feature extracting section 109 consists of a controller 901, an operating counter 902, a difference image memorizing section 903, a previous document area and previous document position memorizing section 904, a document area and document position calculating section 905, a moving vector and changing amount of area calculating section 906, and a changing amount of document area memorizing section 907. And further the document movement feature extracting section 109 provides a terminal 908 and connects to the hand region removing section 107 and the terminals 505.

Figure 19:
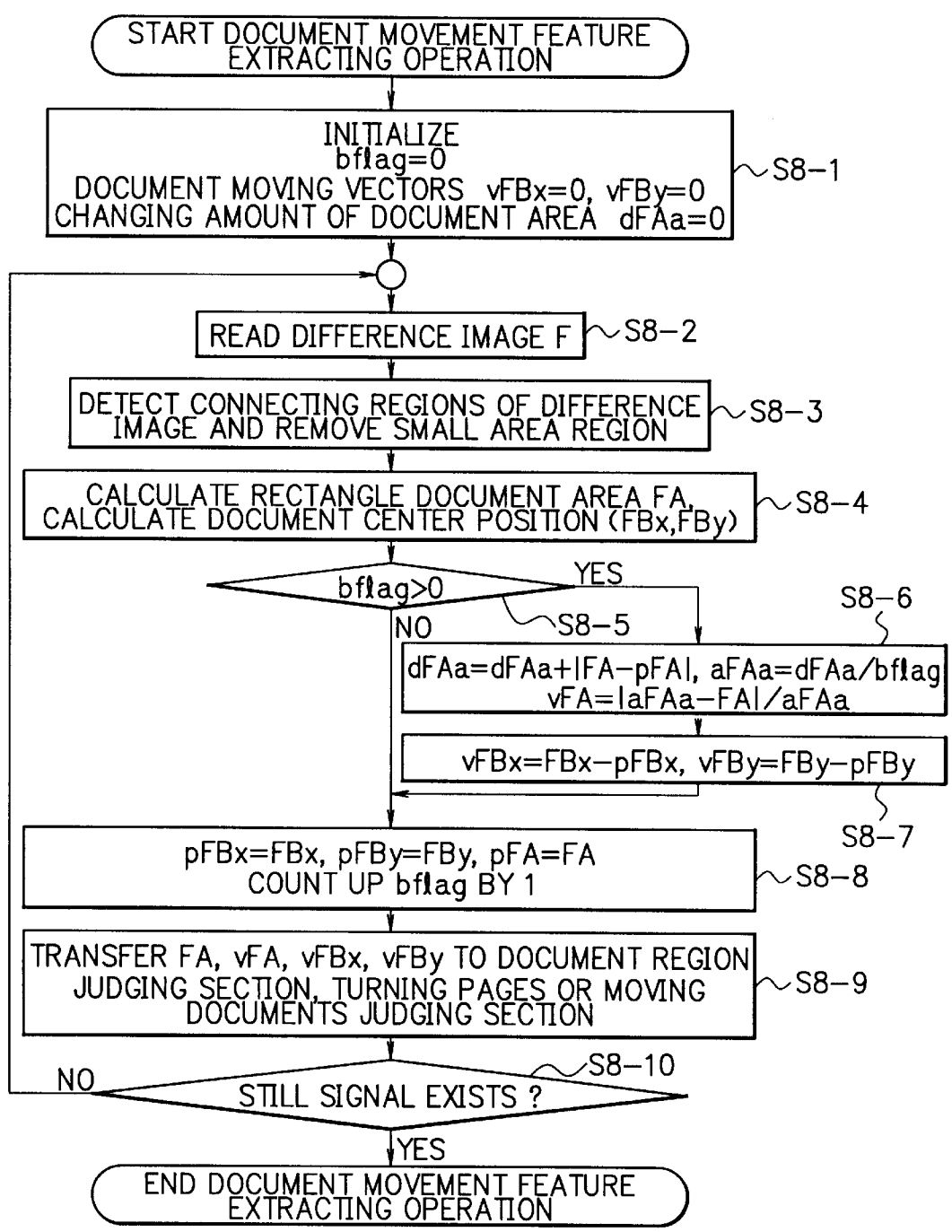
FIG. 19 is a flowchart showing an operation of the document movement feature extracting section in the document image scanning apparatus of the present invention.

FIG. 19 is a flowchart showing an operation of the document movement feature extracting section 109 in the document image scanning apparatus of the present invention. First, the document movement feature extracting section 109 is made to start at the step S1-6 in FIG. 6, with the image being still detecting section 105. At that time, the controller 901 sets a "bflag" of the operating counter 902 to "0", and also sets a document moving vector (vFBx, vFBy) in the moving vector and changing amount of area calculating section 906 to (0, 0) at step S8-1. And also the controller 901 sets a changing amount of document area "dFAa" in the moving vector and changing amount of area calculating section 906 to "0".

At step S8-2, the operation waits until a difference image F is transferred from the hand region removing section 107. At the time when the difference image F is inputted from the hand region removing section 107, the controller 901 makes the inputted difference image F memorize in the difference image memorizing section 903.

At step S8-3, the controller 901 reads the difference image F from the difference image memorizing section 903, and detects a connecting region and removes a small area region, and returns the resulted difference image F to the difference image memorizing section 903 and makes it memorize in the difference image memorizing section 903. The method detecting the connecting region is well known, for example, a method is described in "The electronics information and communication handbook" pp. 1106, section 5.1.2, 1998, published by The Institute of Electronics Information and Communication Engineers. This method forming a connecting region is not directly related to the present invention, therefore the detail structure is omitted. The area of the connecting region is expressed by the number of pixels having the value "1" included in the connecting region. In case that the area of the connecting region is smaller than a threshold value, a pixel having a pixel value "1" in the connecting region is changed to be the value "0". This process is applied to the whole connecting region. At the embodiment of the present invention, the threshold value, by which the removing the connecting region is judged, is set to 10 pixels, however this value is not an essential matter, and any value can be applied.

At step S8-4, the controller 901 starts the document area and document position calculating section 905. The document area and document position calculating section 905 reads the difference image F from the difference image memorizing section 903. And the document area and document position calculating section 905 makes X coordinate of a pixel having the largest X coordinate "x1" and X coordinate of a pixel having the smallest X coordinate "x2", in pixels having the pixel value "1". The same as above, the document area and document position calculating section 905 makes Y coordinate of a pixel having the largest Y coordinate "y1" and Y coordinate of a pixel having the smallest Y coordinate "y2" in pixels having the pixel value "1". Further, the document area and document position calculating section 905 calculates a document area FA by using the following equation (6).

$$FA=(x1-x2)\times(y1-y2) \qquad (6)$$

And the document area and document position calculating section 905 calculates a document position (FBx, FBy) by using the following equation (7).

$$(FBx, FBy)=((x1+x2)/2, (y1+y2)/2) \qquad (7)$$

Further, the document area and document position calculating section 905 memorizes the calculated FA and (FBx, FBy).

At step S8-5, the controller 901 reads the counter value "bflag" from the operating counter 902. Only at the case that the "bflag" is larger than "0" (YES at the step S8-5), the operation performs steps S8-6 and S8-7.

At the step S8-6, the controller 901 starts the moving vector and changing amount of area calculating section 906. The moving vector and changing amount of area calculating section 906 reads the document area FA from the document area and document position calculating section 905, and also reads a previous document area pFA from the previous document area and previous document position memorizing section 904. The moving vector and changing amount of area calculating section 906 calculates an absolute value of the difference between the document area FA and the previous document area pFA, and adds the calculated absolute value to a changing amount of document area dFAa read from the changing amount of document area memorizing section 907, and makes the changing amount of document area memorizing section 907 memorize again the added value. Further, the moving vector and changing amount of area calculating section 906 divides the changing amount of document area dFAa by the value "bflag" read from the operating counter 902, the quotient is memorized as an aFAa. And the moving vector and changing amount of area calculating section 906 calculates a changing amount of area vFA in the following equation (8), by using the quotient aFAa and the document area FA.

$$vFA = |aFAa - FA|/aFAa \qquad (8)$$

The moving vector and changing amount of area calculating section 906 memorizes the calculated changing amount of area vFA.

At the step S8-7, the moving vector and changing amount of area calculating section 906 reads the document position (FBx, FBy) from the document area and document position calculating section 905, and also reads a previous document position (pFBx, pFBy) from the previous document area and previous document position memorizing section 904, and calculates a moving vector (vFBx, vFBy) by using the following equation (9).

$$(vFBx, vFBy) = (FBx - pFBx, FBy - pFBy) \qquad (9)$$

At step S8-8, the controller 901 reads the document position (FBx, FBy) and the document area FA from the document area and document position calculating section 905, and makes the previous document area and previous document position memorizing section 904 memorize the read documents as a previous document position (pFBx, pFBy) and a previous document area pFA. Further, the controller 901 makes the operating counter 902 count up by "1".

At step S8-9, the controller 901 reads the document area FA from the document area and document position calculating section 905, and also reads the changing amount of area vFA and the moving vector (vFBx, vFBy) from the moving vector and changing amount of area calculating section 906, and outputs them to the document region judging section 111 and the turning pages or moving documents judging section 110 from the terminal 908.

At step S8-10, the controller 901 judges whether a still signal from the image being still detecting section 105 through the terminal 505 exists or not. In case that the still signal exists, the controller 901 stops the document movement feature extracting section 109. In case that the still signal does not exist, the operation returns to the step S8-2, and waits until a difference image F is inputted from the hand region removing section 107. In case that the difference image is inputted, the operation repeats the steps from S8-2 to S8-10.

Figure 20:
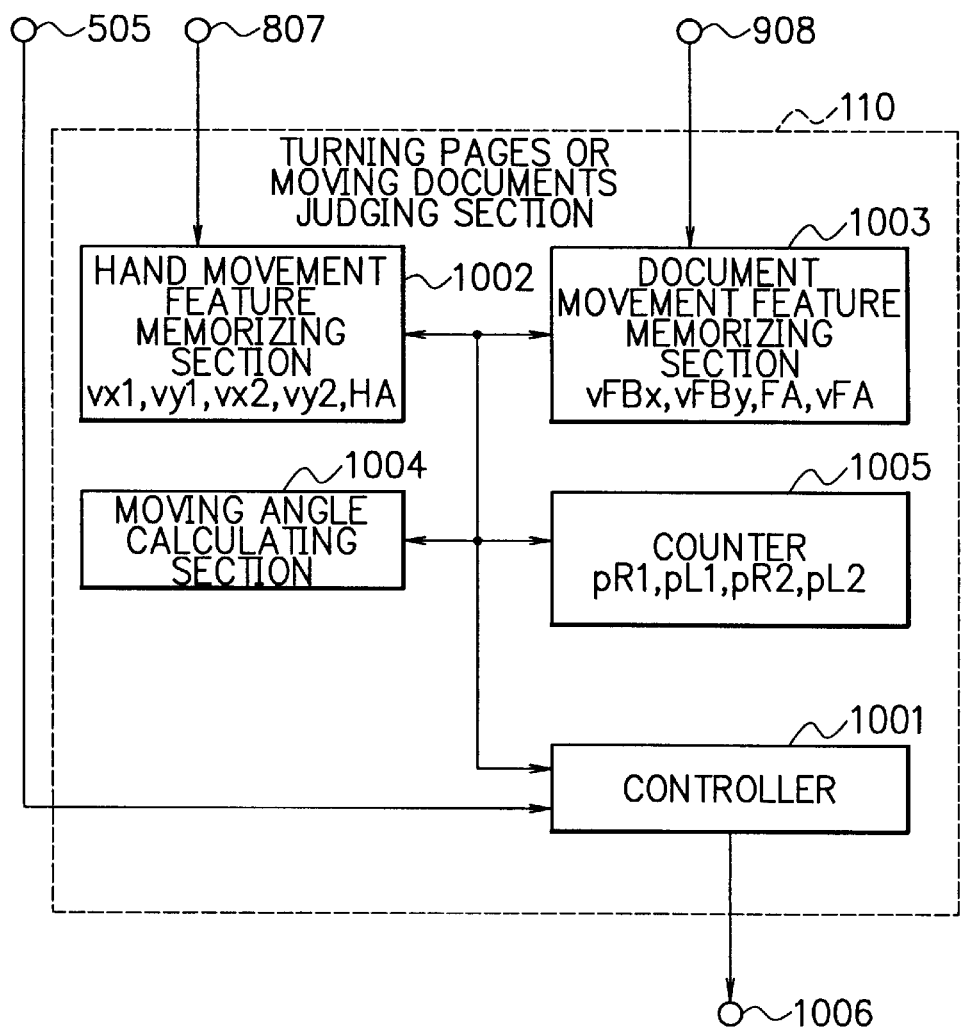
FIG. 20 is a block diagram showing a turning pages or moving documents judging section in the document image scanning apparatus of the present invention.

Referring to the drawings, the structure and operation of the turning pages or moving documents judging section 110 are explained in more detail. FIG. 20 is a block diagram showing the turning pages or moving documents judging section 110 in the document image scanning apparatus of the present invention. As shown in FIG. 20, the turning pages or moving documents judging section 110 consists of a controller 1001, a hand movement feature memorizing section 1002, a document movement feature memorizing section 1003, a moving angle calculating section 1004, and a counter 1005. Further the turning pages or moving documents judging section 110 provides a terminal 1006 and connects to the terminals 505, 807, and 908.

Figure 21:
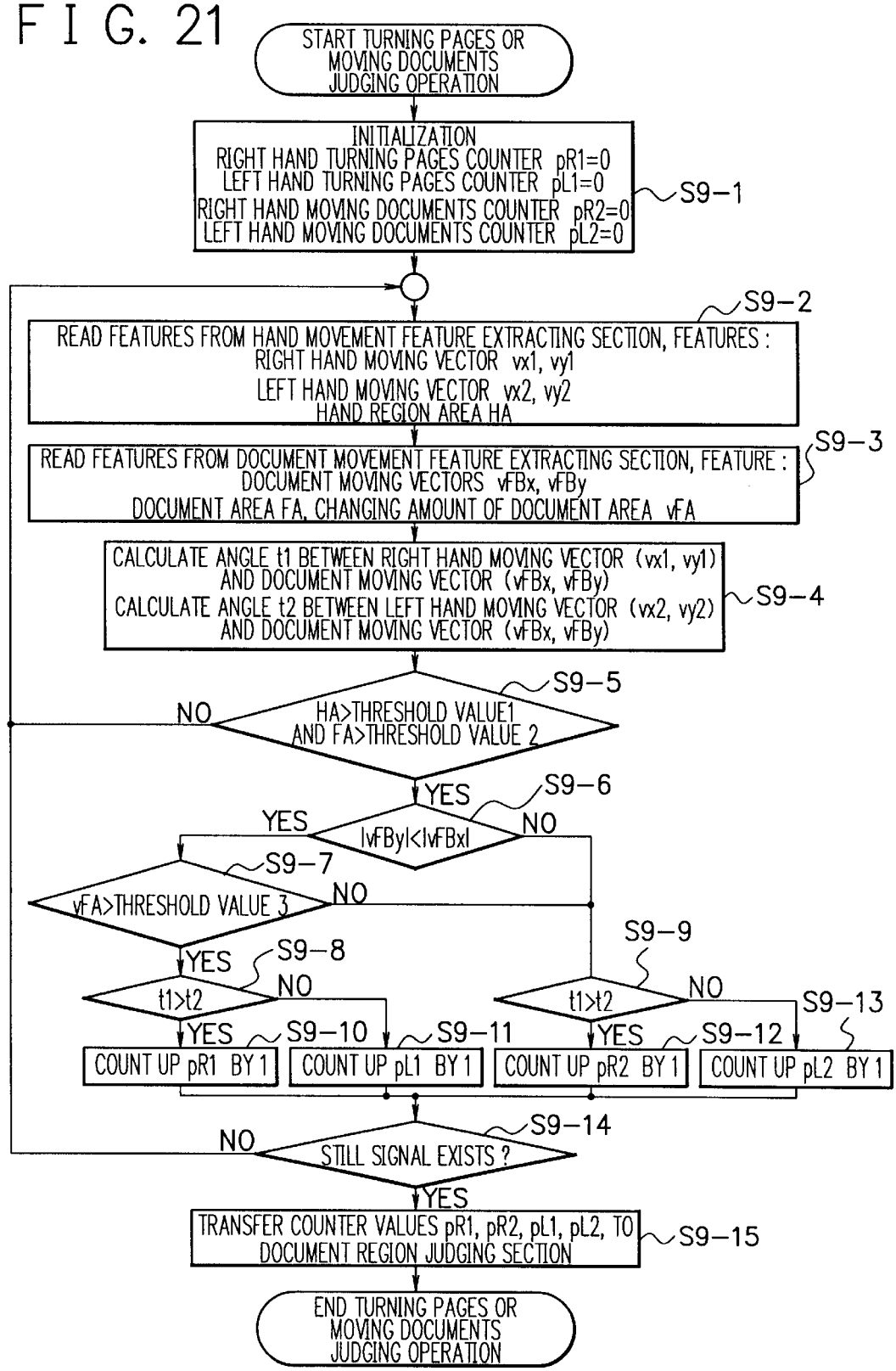
FIG. 21 is a flowchart showing an operation of the turning pages or moving documents judging section in the document image scanning apparatus of the present invention.

FIG. 21 is a flowchart showing an operation of the turning pages or moving documents judging section 110 in the document image scanning apparatus of the present invention. First, the turning pages or moving documents judging section 110 is made to start at the step S1-6 in FIG. 6, with the image being still detecting section 105. At that time, the controller 1001 sets four counter values, turning pages counter pR1 and pL1, and moving documents counter pR2, and pL2 in the counter 1005 to "0" at step S9-1.

At step S9-2, the operation waits until a hand movement feature is inputted from the terminal 807. At the time when the hand movement feature is inputted from the hand movement feature extracting section 108 via the terminal 807, the controller 1001 makes the hand movement feature memorizing section 1002 memorize inputted a right hand moving vector (vx1, vy1), a left hand moving vector (vx2, vy2), and a hand region area HA.

At step S9-3, the operation waits until a document movement feature is inputted from the terminal 908. At the time when the document movement feature is inputted from the document movement feature extracting section 109 via the terminal 908, the controller 1001 makes the document movement feature memorizing section 1003 memorize inputted a document moving vector (vFBx, vFBy), a document area FA, and a changing amount of document area vFA.

At step S9-4, the controller 1001 starts the moving angle calculating section 1004. The moving angle calculating section 1004 reads the right hand moving vector (vx1, vy1) from the hand movement feature memorizing section 1002, and also reads the document moving vector (vFBx, vFBy) from the document movement feature memorizing section 1003, and calculates an angle "t1" between two moving vectors by using the following equation (10).

$$t1 = COS((vx1 \times vFBx + vy1 \times vFBy)/(K1 \times KFB)) \qquad (10)$$

In this equation, COS means a cosine function, K1 means a norm of the right hand moving vector (vx1, vy1), and KFB means a norm of the document moving vector (vFBx, vFBy).

Further, the moving angle calculating section 1004 reads the left hand moving vector (vx2, vy2) from the hand movement feature memorizing section 1002, and calculates an angle "t2" between two moving vectors with using the document moving vector (vFBx, vFBy), in the following equation (11).

$$t2 = COS((vx2 \times vFBx + vy2 \times vFBy)/(K2 \times KFB)) \qquad (11)$$

In this equation, COS means a cosine function, K2 means a norm of the left hand moving vector (vx2, vy2), and KFB means a norm of the document moving vector (vFBx, vFBy).

At step S9-5, the controller 1001 reads the hand region area HA from the hand movement feature memorizing section 1002, and also reads the document area FA from the document movement feature memorizing section 1003. And the operation judges whether the hand region area HA is larger than a first threshold value 1 and the document area FA is larger than a second threshold value 2. In case that both areas HA and FA are larger than the threshold values 1 and 2 (YES at the step S9-5), the operation goes to step S9-6. In case that this condition is not satisfied (NO at the step S9-5), the operation returns to the step S9-2, and the controller 1001 waits until the hand movement feature extracting section 108 transfers the next hand movement feature.

The case, in which the hand region area HA is smaller than the threshold value 1, means cases that the hand does not move or the hand movement is not detected sufficiently. And the case is not considered as a case that an unexpected movement of documents, such as a document slides unintentionally, occurs. And the case, in which the document area FA is smaller than the threshold value 2, means that only hand moving is detected, and is not related to the judgement for turning pages or moving documents. At the embodiment of the present invention, the threshold values 1 and 2 are made to be 10, however these values are not essential values, any values can be applied.

At step S9-6, the controller 1001 reads the document moving vector (vFBx, vFBy) from the document movement feature memorizing section 1003, and compares absolute values of vFBx and vFBy. In case that the absolute value of vFBx is larger than that of vFBy (YES at the S9-6), it is judged that the document moves to the X direction, and the operation goes to step S9-7. On the contrary, the absolute value of vFBy is larger (NO at the step S9-6), it is judged that the document moves to the Y direction, and the operation goes to step S9-9.

At the step S9-7, the controller 1001 reads the changing amount of document area vFA from the document movement feature memorizing section 1003, and compares the vFA with a threshold value 3. In case that the changing amount of document area vFA is larger than the threshold value 3 (YES at the step S9-7), the operation goes to step S9-8. In case that the changing amount of document area vFA is smaller (NO at the step S9-7), the change of the document area is small and it is judged that the document moves, and the operation goes to step S9-9. At the embodiment of the present invention, the threshold value 3 is made to be 1000, however, this value is not an essential value, any value can be applied.

At the step S9-8, the angles between vectors "t1" and "t2" calculated at the step S9-4 are compared. In case that the "t1" is larger than the "t2" (YES at the step S9-8), the operation goes to step S9-10, and the counter 1005 counts up pR1 by 1. On the contrary, in case that the "t1" is smaller than the "t2" (NO at the step S9-8), the operation goes to step S9-11, and the counter 1005 counts up pL1 by 1.

At the step S9-9, the angles "t1" and "t2" calculated at the step S9-4 are compared. In case that the "t" is larger than the "t2" (YES at the step S9-9), the operation goes to step S9-12, and the counter 1005 counts up pR2 by 1. On the contrary, in case that the "t1" is smaller than the "t2" (NO at the step S9-9), the operation goes to step S9-13, and the counter 1005 counts up pL2 by 1. After finished the count up, the steps from S9-10 to S9-13 go to step S9-14.

At the step S9-14, the controller 1001 judges whether a still signal exists or not from the image being still detecting section 105 through the terminal 505. In case that the still signal exists (YES at the step S9-14), the operation goes to step S9-15, the controller 1001 transfers the counter values pR1, pL1, pR2, and pL2 to the document region judging section 111, and stops the operation of the turning pages or moving documents judging section 110. In case that the still signal does not exist, the operation returns to the step S9-2, and waits until a hand movement feature is inputted from the hand movement feature extracting section 108 via the terminal 807. In case that the hand movement feature is inputted, the operation repeats the steps from S9-3 to S9-14.

Figure 22:
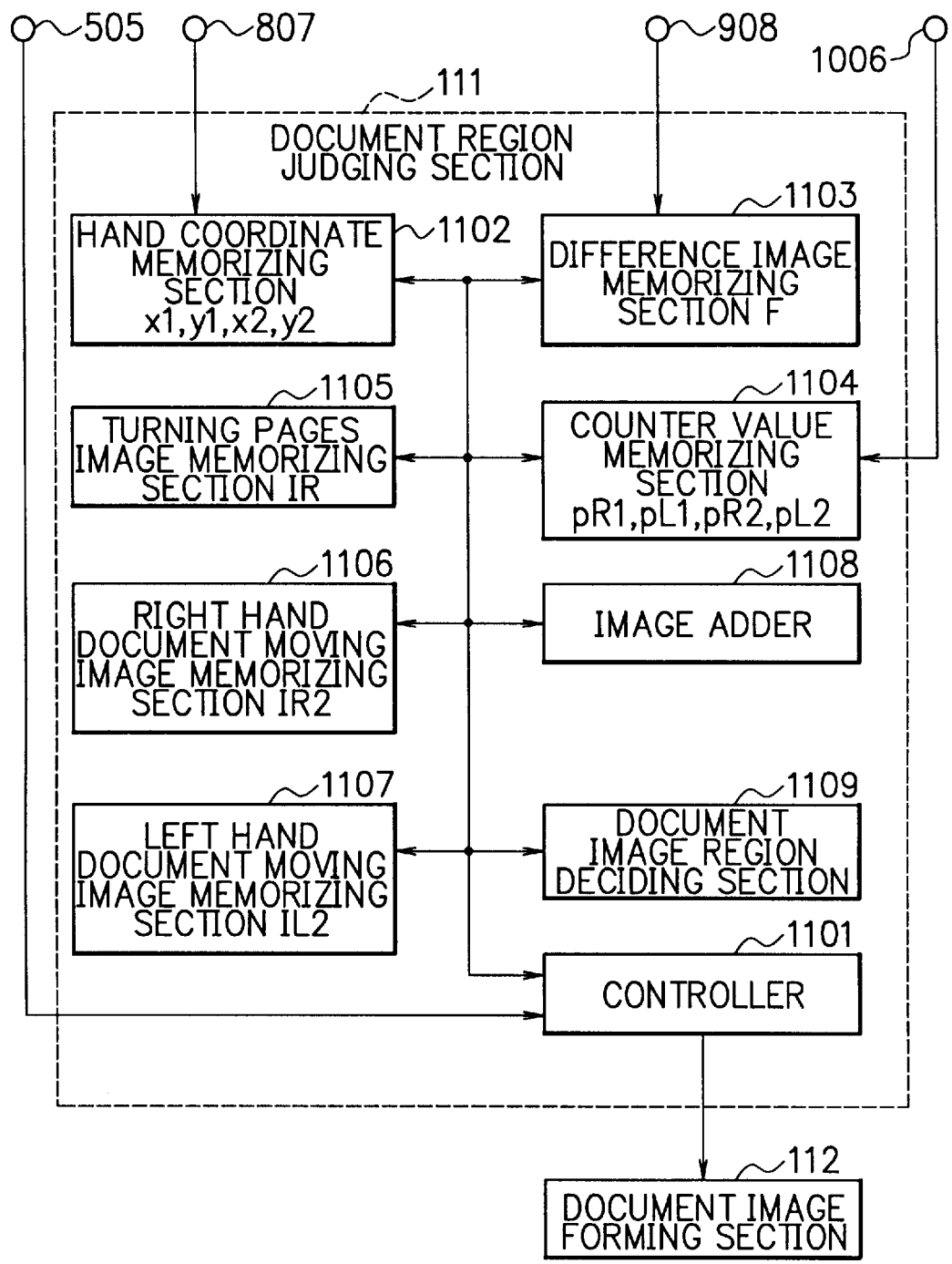
FIG. 22 is a block diagram showing a document region judging section in the document image scanning apparatus of the present invention.

Referring to the drawings, the structure and operation of the document region judging section 111 are explained in more detail. FIG. 22 is a block diagram showing the document region judging section 111 in the document image scanning apparatus of the present invention. As shown in FIG. 22, the document region judging section 111 consists of a controller 1101, a hand coordinate memorizing section 1102, a difference image memorizing section 1103, a counter value memorizing section 1104, a turning pages image memorizing section 1105, a right hand document moving image memorizing section 1106, a left hand document moving image memorizing section 1107, an image adder 1108, and a document image region deciding section 1109. Further the document region judging section 111 connects to terminals 505, 807, 908, 1006, and the document image forming section 112.

Figure 23:
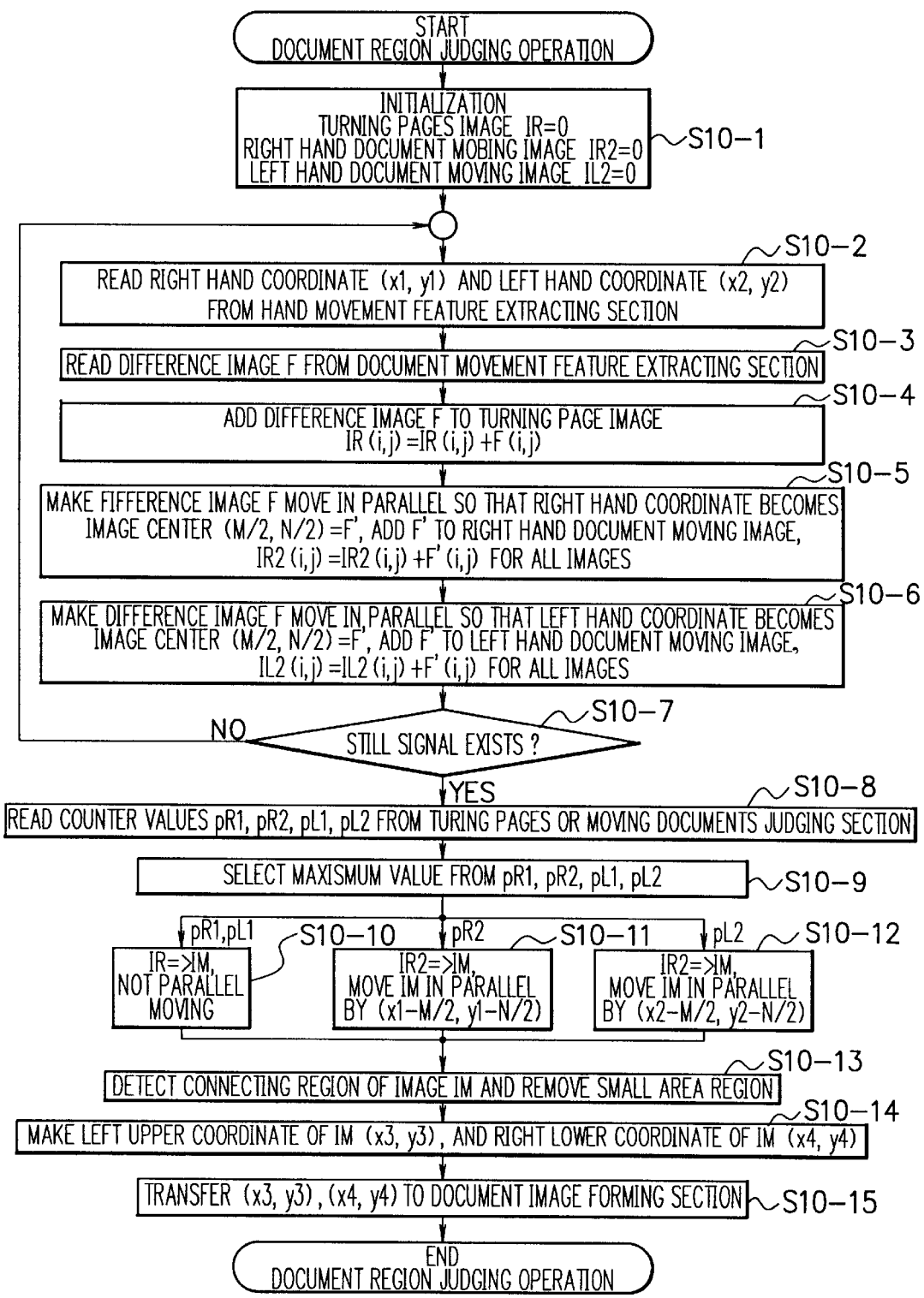
FIG. 23 is a flowchart showing an operation of the document region judging section in the document image scanning apparatus of the present invention.

FIG. 23 is a flowchart showing an operation of the document region judging section 111 in the document image scanning apparatus of the present invention. First, the document region judging section 111 is made to start at the step S1-6 in FIG. 6, with the image being still detecting section 105. At that time, the controller 1101 sets all pixel values in a turning pages image IR memorized in the turning pages image memorizing section 1105 to "0" at step S10-1. And the controller 1101 also sets all pixel values in a right hand document moving image IR2 memorized in the right hand document moving image memorizing section 1106 to "0" and sets all pixel values in a left hand document moving image IL2 memorized in the left hand document moving image memorizing section 1107 to "0" at the step S10-1.

At step S10-2, the operation waits until a hand movement feature is transferred from the hand movement feature extracting section 108 via the terminal 807. When the hand movement feature is inputted from the hand movement feature extracting section 108, the controller 1101 makes the hand coordinate memorizing section 1102 memorize a right hand coordinate (x1, y1) and a left hand coordinate (x2, y2). And the operation goes to step S10-3.

At the step S10-3, the operation waits until a difference image F is inputted from the document movement feature extracting section 109 via the terminal 908. When the difference image F is inputted, the controller 1101 makes the difference image memorizing section 1103 memorize the inputted difference image F.

At step S10-4, the controller 1101 transfers the difference image F to the image adder 1108 by reading from the difference image memorizing section 1103. And the controller 1101 transfers a turning page image IR to the image adder 1108 by reading from the turning pages image memorizing section 1105. The image adder 1108 adds the inputted difference image F and the turning page image IR. The addition of these two images means that two pixel values are added by reading pixel values at the position of two image coordinates (i, j), and the added value is made to a pixel value at the position of the added image coordinate (i, j). This calculation is performed for all pixels. The controller 1101 makes the turning pages image memorizing section 1105 memorize the added images by reading them.

At step S10-5, the controller 1101 reads a right hand coordinate (x1, y1) from the hand coordinate memorizing section 1102 and the difference image F from the difference image memorizing section 1103, and forms an image in which the coordinate position (x1, y1) of the difference image F is made to be the center (M/2, N/2) of the image by moving in parallel. That is, an image F' is formed by that the pixel value of the coordinate (i, j) of the difference image F is memorized at the coordinate (i−x1+M/2, j−y1+N/2). This transcription is performed for the coordinates (i, j) in all images.

If the coordinate (i−x1+M/2, j−y1+N/2) is deviated from the range of the image, the value is not transcribed. And the value of pixels not transcribed in the pixels of images to be formed is made to be "0". The formed image F' is transferred to the image adder 1108. The controller 1101 reads a right hand document moving image IR2 from the right hand document moving image memorizing section 1106 and transfers the read image to the image adder 1108. The image adder 1108 adds the inputted image F' and the right hand document moving image IR2. The addition of these two images is performed by the method mentioned at the step S10-4. The controller 1101 reads the calculated image and makes the right hand document moving image memorizing section 1106 memorize.

At step S10-6, the controller 1101 reads a left hand coordinate (x2, y2) from the hand coordinate memorizing section 1102 and the difference image F from the difference image memorizing section 1103, and forms an image in which the coordinate position (x2, y2) of the difference image F is made to be the center (M/2, N/2) of the image by moving in parallel. That is, an image F' is formed by that the pixel value of the coordinate (i, j) of the difference image F is memorized at the coordinate (i−x2+M/2, j−y2+N/2). This transcription is performed for the coordinates (i, j) in all images.

If the coordinate (i−x2+M/2, j−y2+N/2) is deviated from the range of the image, the value is not transcribed. And the value of pixels not transcribed in the pixels of images to be formed is made to be "0". The formed image F' is transferred to the image adder 1108. The controller 1101 reads a left hand document moving image IL2 from the left hand document moving image memorizing section 1107 and transfers the read image to the image adder 1108. The image adder 1108 adds the inputted image F' and the left hand document moving image IL2. The addition of these two images is performed by the method mentioned at the step S10-4. The controller 1101 reads the calculated image and makes the left hand document moving image memorizing section 1107 memorize.

At step S10-7, the controller 1101 judges whether a still signal from the image being still detecting section 105 via the terminal 505 exists. In case that the still signal does not exist (NO at the step S10-7), the operation returns to the step S10-2, and the operation of the steps from the S10-2 to the S10-7 is repeated at the time when an image is inputted. In case that the still signal exists (YES at the step S10-7), the operation goes to step S10-8.

At the step S10-8, after the still signal is inputted, counter values are transferred from the turning pages or moving documents judging section 110 via the terminal 1006. In case that the counter values pR1, pR2, pL1, and pL2 are inputted, these values are memorized in the counter value memorizing section 1104.

At step S10-9, the controller 1101 reads the four counter values pR1, pR2, pL1, and pL2 from the counter value memorizing section 1104 and selects a maximum value by comparing them. In case that the maximum value is pR1 or pL1, the operation goes to step S10-10. And in case that the maximum value is pR2, the operation goes to step S10-11, and in case that the maximum value is pL2, the operation goes to step S10-12.

At the step S10-10, the controller 1101 reads the turning pages image IR from the turning pages image memorizing section 1105 and transfers the read image to the document image region deciding section 1109. At the step S10-11, the controller 1101 reads the right hand document moving image IR2 from the right hand document moving image memorizing section 1106, and the right hand coordinate (x1, y1) from the hand coordinate memorizing section 1102. And the controller 1101 forms an image by moving in parallel so that the coordinate position (M/2, N/2) becomes the coordinate position (x1, y1), and transfers the formed image to the document image region deciding section 1109. The moving in parallel mentioned above is performed by that a memorized image IM is formed at the position of the coordinate (i+x1−M/2, j+y1−N/2) by memorizing the value of the pixel (i, j) at the right hand document moving image IR2. This transcription is performed for all values of pixels (i, j) in the image. If the coordinate (i+x1−M/2, j+y1−N/2) is deviated from the region of the image, the value is not transcribed. And the value of pixels not transcribed in the pixels of the IM image to be formed is made to be "0".

At the step S10-12, the controller 1101 reads the left hand document moving image IL2 from the left hand document moving image memorizing section 1106, and the left hand coordinate (x2, y2) from the hand coordinate memorizing section 1102. And the controller 1101 forms an image by moving in parallel so that the coordinate position (M/2, N/2) becomes the coordinate position (x2, y2), and transfers the formed image to the document image region deciding section 1109. The moving in parallel mentioned above is performed by that a memorized image IM is formed at the position of the coordinate (i+x2−M/2, j+y2−N/2) by memorizing the value of the pixel (i, j) at the left hand document moving image IL2. This transcription is performed for all values of pixels (i, j) in the image. If the coordinate (i+x2−M/2, j+y2−N/2) is deviated from the region of the image, the value is not transcribed. And the value of pixels not transcribed in the pixels of the IM image to be formed is made to be "0".

At steps from S10-13 to S10-14, the operation of the document image region deciding section 1109 is explained. First, at the step S10-13, connecting region detection and removal of small area regions for the images IM inputted to the document image region deciding section 1109 are performed. In this operation, the pixel value of each pixel is one or more is regarded as a pixel value "1", and the operation at the step S10-13 is performed.

The method detecting the connecting region is well known, for example, a method is described in "The electronics information and communication handbook" pp. 1106, section 5.1.2, 1998, published by The Institute of Electronics Information and Communication Engineers. This method forming a connecting region is not directly related to the present invention, therefore the detail structure is omitted. The area of the connecting region is expressed by the number of pixels having the value "1" included in the connecting region. In case that the area of the connecting region is smaller than a threshold value, a pixel having a pixel value "1" in the connecting region is changed to be the value "0". This process is applied to the whole connecting region. At the embodiment of the present invention, the threshold value, by which the removing the connecting region is judged, is set to 10 pixels, however this value is not an essential matter, and any value can be applied.

At the step S10-14, a pixel having the largest X coordinate, a pixel having the smallest X coordinate, a pixel having the largest Y coordinate, and a pixel having the smallest Y coordinate, in pixels that have pixel values being more than the threshold value in the image whose small area connecting region is removed, are detected. And the largest X coordinate is made to be "x4", the smallest X coordinate is made to be "x3", the largest Y coordinate is made to be "y4", and the smallest Y coordinate is made to be "y3". At the embodiment of the present invention, the threshold value is made to be "2", however, this value is not an essential value, any value can be applied.

At step S10-15, the coordinates (x3, y3) and (x4, y4) are transferred to document image forming section 112 from the controller 1101.

Figure 24:
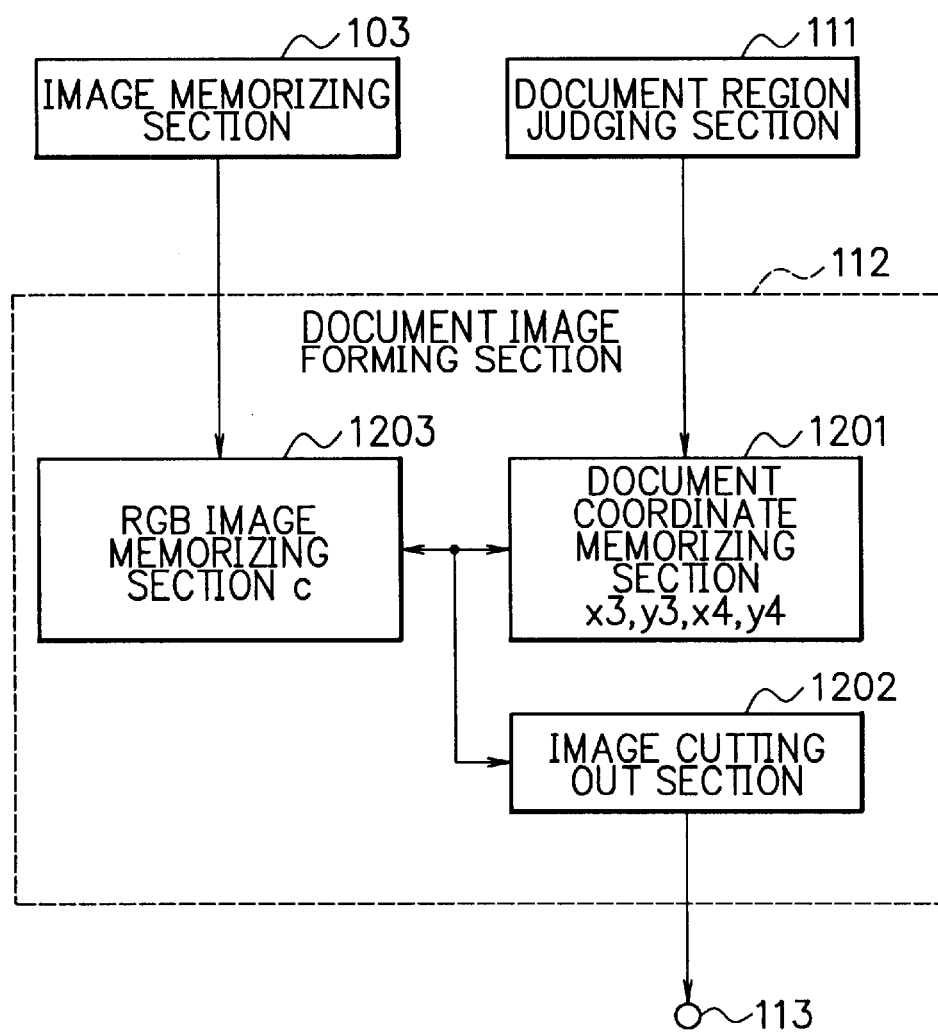
FIG. 24 is a block diagram showing a document image forming section in the document image scanning apparatus of the present invention.

Referring to the drawing, the structure and operation of the document image forming section 112 are explained in more detail. FIG. 24 is a block diagram showing the document image forming section 112 in the document image scanning apparatus of the present invention. As shown in FIG. 24, the document image forming section 112 consists of a document coordinate memorizing section 1201, an image cutting out section 1202, and an RGB image memorizing section 1203. The document image forming section 112 connects to the image memorizing section 103, the document region judging section 111, and the terminal 113.

The document image forming section 112 is started when the document coordinates (x3, y3) and (x4, y4) are inputted from the document region judging section 111. The RGB image memorizing section 1203 memorizes a red image, a green image, and a blue image by reading from the image memorizing section 103. The image cutting out section 1202 cuts out a region being at the left upper pixel position (x3, y3) and at the right lower pixel position (x4, y4) from the red image in the RGB image memorizing section 1203, and memorizes the cut out region as a document red image. As the same as above, the image cutting out section 1202 cuts out a region being at the left upper pixel position (x3, y3) and at the right lower pixel position (x4, y4) from the green image in the RGB image memorizing section 1203, and memorizes the cut out region as a document green image. Further, the image cutting out section 1202 cuts out a region being at the left upper pixel position (x3, y3) and at the right lower pixel position (x4, y4) from the green image in the RGB image memorizing section 1203, and memorizes the cut out region as a document green image. Finally, the image cutting out section 1202 outputs the document red image, the document green image, and the document blue image from the terminal 113. This is an example, it is not necessary to make the red, green, and blue images being objects to be cut out. And a region being at the left upper pixel position (x3, y3) and at the right lower pixel position (x4, y4) from a gray scale image in the RGB image memorizing section 1203 is cut out, and the cut out region can be outputted from the terminal 113 as a document image.

At the embodiment of the present invention, as images, a red image, a green image, a blue image, and a gray scale image are used. However, generally, in case that a color image is inputted, three images composed of a luminance image and two kinds of color images are inputted. At this case, the embodiment mentioned above can be easily applied.

At the embodiment of the present invention, in case that a hand region is detected, a region composed of pixels, in which the difference between a color memorized in the hand color memorizing section 604 in the hand region detecting section 106 and the hand color is small, is selected. However, if the selected region is not enough, a region expanded the selected region can be decided as the hand region. Further plural colors instead of one color can be used as the hand color.

As mentioned above, the document image scanning apparatus and method of the present invention provide an image being still detecting means (process), which detects that an inputted image becomes still, and a document image forming means (process), in which a document image is obtained by cutting out an image displayed at when the image being still detecting means detects that the image is still. Therefore, even when the hand does not take off the document, the document image can be obtained at the right timing.

And the document image scanning apparatus and method of the present invention provides an image being still detecting means (process), which detects that an inputted image becomes still, a hand region detecting means (process), which detects a hand region, a hand region removing means (process), which removes the hand region, and a document image forming means (process), in which a document image is obtained by cutting out an image displayed at when the image being still detecting means detects that the image is still. Therefore, only the document part, in which the hand part is not included, can be obtained at the right timing as the document image.

Furthermore, the document image scanning apparatus and method of the present invention provides an image being still detecting means (process), which detects that an inputted image becomes still, a hand region detecting means (process), which detects a hand region, a hand region removing means (process), which removes the hand region, a hand movement feature extracting means (process), which extracts features of hand movements, a document movement feature extracting means (process), which extracts features of document movements, a turning pages or moving document judging means (process), which judges whether the movement is turning pages or moving documents by the features extracted at the hand movement feature extracting means and the document movement feature extracting means, a document region judging means (process) in which the document region is judged by the movement of turning pages or moving documents, and a document image forming means (process), in which a document image is obtained by cutting out an image displayed at when the image being still detecting means detects that the image is still. Therefore, the document image can be obtained at the right timing by separating the hand image from the document image.

And, the document image scanning apparatus and method of the present invention provides a hand region detecting means (process), which detects a hand region, a hand region removing means (process), which removes the hand region, and a document image forming means (process), which obtains a document image by cutting out an image displayed. Therefore, only the document part image not including a hand part can be obtained.

And, the document image scanning apparatus and method of the present invention provides a hand region detecting means (process), which detects a hand region, a hand region removing means (process), which removes the hand region, a hand movement feature extracting means (process), which extracts features of hand movements, a document movement feature extracting means (process), which extracts features of document movements, a turning pages or moving documents judging means (process), which judges whether the movement is turning pages or moving documents by the features extracted at the hand movement feature extracting means and the document movement feature extracting means, and a document image forming means (process), which obtains a document image by cutting out an image displayed. Therefore, the document image can be obtained by separating the hand image from the document image.

While the present invention has been described with reference to the particular illustrative embodiment, it is not to be restricted by that embodiment but only by the appended claims. It is to be appreciated that those skilled in the art can change or modify the embodiment without departing from the scope and spirit of the present invention.

What is claimed is:

1. A document image scanning apparatus, in which images are inputted by using a non-contact type image inputting apparatus and document images are obtained from said inputted images, comprising:

a still image detecting means for detecting that said inputted image is still based at least in part on a calculation of a difference in values of first adjacent pixels in a first inputted image and a calculation of a difference in values of second adjacent pixels in a second inputted image;

a hand region detecting means for detecting a hand region;

a hand region removing means for removing said hand region;

a hand movement feature extracting means for extracting features of hand movements;

a turning pages or moving documents judging means for judging whether a movement is turning pages or moving documents from said features extracted at said hand movement feature extracting means;

a document region judging means for judging a document region by said movement of turning pages or moving documents; and a document forming means for obtaining said document image when said still image detecting means detects a still image.

2. A document image scanning apparatus, in which images are inputted by using a non-contact type image inputting apparatus and document images are obtained from said inputted images, comprising:

still image detecting means for detecting that said inputted image is still based at least in part on a calculation of a difference in values of first adjacent pixels in a first inputted image and a calculation of a difference in values of second adjacent pixels in a second inputted image;

a hand region detecting means for detecting a hand region;

a hand region removing means for removing said hand region; and a document forming means for obtaining said document image when said still image detecting means detects a still image.

3. A document image scanning apparatus, in which images are inputted by using a non-contact type image inputting apparatus and document images are obtained from said inputted images, comprising:

still image detecting means for detecting that said inputted image is still;

a hand region detecting means for detecting a hand region;

a hand region removing means for removing said hand region;

a hand movement feature extracting means for extracting features of hand movements;

a document movement feature extracting means for extracting features of document movements;

a turning pages or moving documents judging means for judging whether a movement is turning pages or moving documents from said features extracted at said hand movement feature extracting means and said document movement feature extracting means;

a document region judging means for judging a document region by said movement of turning pages or moving documents; and a document forming means for obtaining said document image when said still image detecting means detects a still image.

4. A document image scanning apparatus, in which images are inputted by using a non-contact type image inputting apparatus and document images are obtained from said inputted images, comprising:

a hand region detecting means for detecting a hand region;

a hand region removing means for removing said hand region;

a hand movement feature extracting means for extracting features of hand movements;

a document movement feature extracting means for extracting features of document movements;

a turning pages or moving documents judging means for judging whether a movement is turning pages or moving documents from said features extracted at said hand movement feature extracting means and said document movement feature extracting means;

a document region judging means for judging a document region by said movement of turning pages or moving documents; and a document forming means for obtaining said document image by cutting out from a displayed image.

5. A document image scanning method, in which images are inputted by using a non-contact type image inputting apparatus and document images are obtained from said inputted images, comprising the steps of:

detecting that said inputted image is still based at least in part on a calculation of a difference in values of first adjacent pixels in a first inputted image and a calculation of a difference in values of second adjacent pixels in a second inputted image;

detecting a hand region;

removing said hand region;

extracting features of hand movements;

judging whether a movement is turning pages or moving documents from said features extracted at said step of extracting hand movement features;

judging a document region by said step of judging whether said movement is turning pages or moving documents; and forming a document image when a still image is detected.

6. A document image scanning method, in which images are inputted by using a non-contact type image inputting apparatus and document images are obtained from said inputted images, comprising the steps of:

detecting that said inputted image is still based at least in part on a calculation of a difference in values of first adjacent pixels in a first inputted image and a calculation of a difference in values of second adjacent pixels in a second inputted image;

detecting a hand region;

removing said hand region; and forming a document image when a still image is detected.

7. A document image scanning method, in which images are inputted by using a non-contact type image inputting apparatus and document images are obtained from said inputted images, comprising the steps of:

detecting that said inputted image is still;

detecting a hand region;

removing said hand region;

extracting features of hand movements;

extracting features of document movements;

judging whether a movement is turning pages or moving documents from said features extracted at said steps of extracting hand movement features and extracting document movement features;

judging a document region by said step of judging whether said movement is turning pages or moving documents; and forming a document image when a still image is detected.

8. A document image scanning method, in which images are inputted by using a non-contact type image inputting apparatus and document images are obtained from said inputted images, comprising:

detecting a hand region;

removing said hand region;

extracting features of hand movements;

extracting features of document movements;

judging whether a movement is turning pages or moving documents from said features extracted at said steps of extracting hand movement features and extracting document movement features;

judging a document region by said step of judging whether said movement is turning pages or moving documents; and forming a document image by cutting out from a displayed image.

9. A document image scanning apparatus, in which images are inputted by using a non-contact type image inputting apparatus and document images are obtained from said inputted images, comprising:

a still image detecting section for detecting that said inputted image is still based at least in part on a calculation of a difference in values of first adjacent pixels in a first inputted image and a calculation of a difference in values of second adjacent pixels in a second inputted image;

a hand region detecting section for detecting a hand region;

a hand region removing section for removing said hand region;

a hand movement feature extracting section for extracting features of hand movements;

a turning pages or moving documents judging section for judging whether a movement is turning pages or moving documents from said features extracted at said hand movement feature extracting section;

a document region judging section for judging a document region by said movement of turning pages or moving documents; and a document forming section for obtaining said document image when said still image detecting section detects a still image.

* * * * *